United States Patent [19]
Dolgoff

[11] Patent Number: 5,012,274
[45] Date of Patent: Apr. 30, 1991

[54] ACTIVE MATRIX LCD IMAGE PROJECTION SYSTEM

[76] Inventor: Eugene Dolgoff, 936 Roxbury Dr., Westbury, N.Y. 11590

[21] Appl. No.: 290,040

[22] Filed: Dec. 23, 1988

Related U.S. Application Data

[63] Continuation-in-part of Ser. No. 140,233, Dec. 31, 1987, abandoned.

[51] Int. Cl.$^5$ .............................................. G09G 3/36
[52] U.S. Cl. .................................... 340/702; 340/784; 340/795
[58] Field of Search ............... 340/795, 705, 784, 765, 340/702, 703, 796, 815.17, 815.31; 358/60, 61, 56, 231, 232, 236, 88, 89, 3; 350/331 R, 331 T, 334, 339 F, 339 R, 117, 128; 181/200, 201, 206, 211, 225; 353/31, 32, 33, 34, 84, 122

[56] References Cited

U.S. PATENT DOCUMENTS

| | | | |
|---|---|---|---|
| 3,442,508 | 5/1969 | Rudas | 350/117 |
| 3,523,717 | 8/1970 | Glenn, Jr. | 350/128 |
| 3,824,003 | 7/1974 | Koda et al. | |
| 4,025,724 | 5/1977 | Davidson, Jr. et al. | 181/206 |
| 4,127,322 | 11/1978 | Jacobson et al. | |
| 4,158,860 | 6/1979 | Irie et al. | |
| 4,215,762 | 8/1980 | Cunningham et al. | 181/201 |
| 4,349,817 | 9/1982 | Hoffman et al. | 340/815.31 |
| 4,365,869 | 12/1982 | Hareng et al. | 340/784 |
| 4,389,096 | 6/1983 | Hori et al. | 350/339 R |
| 4,455,576 | 6/1984 | Hoshi | |
| 4,460,247 | 7/1984 | Hilsum et al. | 350/331 T |
| 4,591,902 | 5/1986 | Masubuchi | |
| 4,611,245 | 9/1986 | Trias | |
| 4,632,514 | 12/1986 | Ogawa et al. | 350/339 F |
| 4,635,127 | 1/1987 | Togashi | |
| 4,672,457 | 6/1987 | Hyatt | |

(List continued on next page.)

FOREIGN PATENT DOCUMENTS

| | | |
|---|---|---|
| 79596 | 1/1973 | Japan . |
| 2916 | 8/1985 | Japan . |
| 179723 | 10/1985 | Japan . |

OTHER PUBLICATIONS

A. G. Dewey et al., 7.1/2:00 P.M.: A 64-Million Pel Liquid-Crystal Projection Display, SID 83 DIGEST, p. No. 36.

(List continued on next page.)

*Primary Examiner*—Jeffrey A. Brier
*Attorney, Agent, or Firm*—Walter G. Marple, Jr.; Shahan Islam

[57] ABSTRACT

An active matrix LCD light valve between crossed polarizers, utilizing individual transistors to control each "pixel area" of the LCD and storage elements to store signal data for each pixel, with optically shielded "dead spaces" between pixels to eliminate electric field crosstalk and non-information-bearing light bleed through, is illuminated with a bright independent light source which creates a video image projected via specialized projection optics onto an internal or external screen without distortions, regardless of the angle of projection onto the screen. Use of heat sinks, IR reflective coatings, heat absorbing optics, optional fluid, and a thermistor controlled pixel transistor bias voltage injection servo circuit stabilizes image performance, maintaining accurate color and contrast levels as the LCD changes temperature. In one embodiment of the invention, use of a multi-color LCD with a stepped cavity, producing different thicknesses of LCD for the different wavelengths that pass through it, allows a linear correspondence between the wavelengths passing through the LCD to produce true black, high contrast, and CRT-like color rendition. A dichroic mirror arrangement is used to overlap differently colored pixels and a striped mirror system is used to duplicate and offset the resulting "full color" pixels or a lens system is used to expand existing pixels to fill the "dead spaces" between pixels in the projected image, creating a continuous image with no apparent stripes or dots. A special venetian-blind type of screen is also disclosed and methods for using the system to view three dimensional video are also explained.

48 Claims, 15 Drawing Sheets

U.S. PATENT DOCUMENTS

| | | |
|---|---|---|
| 4,680,579 | 7/1987 | Ott .................................... 340/783 |
| 4,730,211 | 3/1988 | Hasegawa ............................ 358/60 |
| 4,733,948 | 3/1988 | Kitahara ......................... 350/339 F |
| 4,739,396 | 4/1988 | Hyatt ................................... 358/60 |
| 4,745,485 | 5/1988 | Iwasaki . |
| 4,748,510 | 5/1988 | Umezawa . |
| 4,766,430 | 8/1988 | Gillette et al. . |
| 4,904,061 | 2/1990 | Aruga ............................ 350/339 F |

OTHER PUBLICATIONS

Morozumi et al., 4.25-in. and 1.51-in. B/W and Full-Color LC Video Displays Addressed by Poly-Si TFTs; SID 84 DIGEST; p. 316.

Morozumi et al., 20.4: LCD Full-Color Video Projector; SID 86 DIGEST, p. 375.

Aruga et al., 6.4 High-Resolution Full-Color Video Projector with Poly-Si TFT Array Light Valves, SID 87 DIGEST, p. 75.

7.5/4:00 P.M.: An 8' Display Using a Laser-Addressed White-on-Black Mode Liquid Crystal Light Valve, SID 83 DIGEST, p. 44.

F. Funada et al., 16.5: An Amorphous-SI TFT Addressed 3.2-in. Full-Color LCD SID 86 DIGEST, p. 293.

S. Hotta et al., 16.6: Full-Color Multi-Gap LC-TV Display Panel Addressed by a-Si TFTs, SID 86 DIGEST, p. 296.

F. C. Luo et al., 15.3: A 640×400 CdSe TFT-LC Display Panel, SID 85 DIGEST, p. 286.

FIG. 4
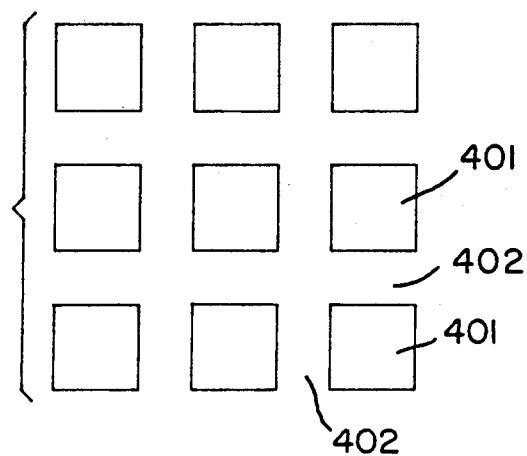
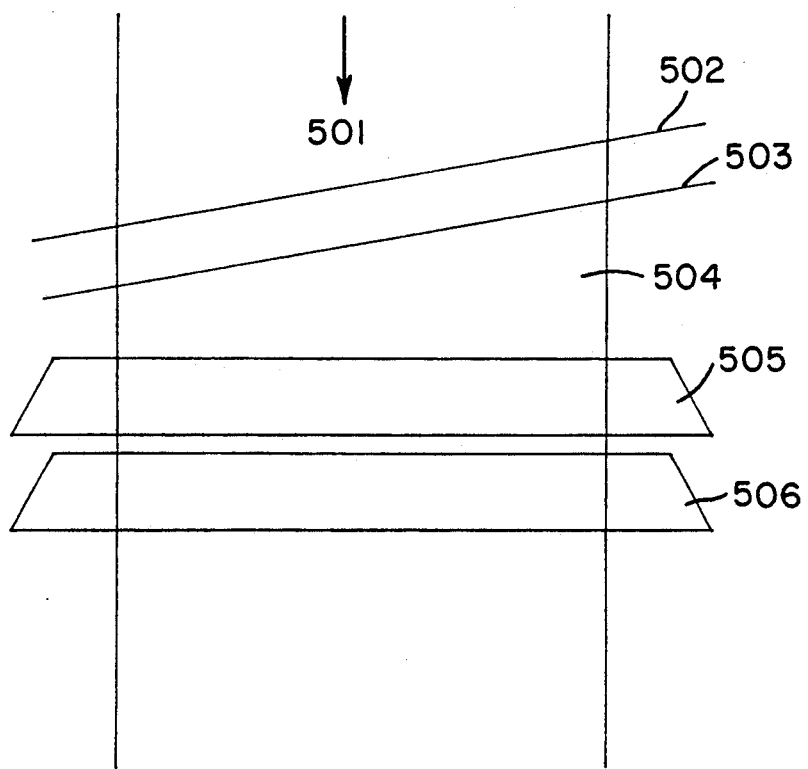
FIG. 5

ACTIVE MATRIX LCD IMAGE PROJECTION SYSTEM

This is a continuation in part application of U.S. application Ser. No. 07/140,233, entitled "AN IMPROVED VIDEO DISPLAY SYSTEM", filed Dec. 31, 1987, now abandoned.

FIELD OF THE INVENTION

The present invention relates generally to video display devices and more particularly to an improved video display system employing an active matrix LCD in conjunction with projection optics.

BACKGROUND OF THE INVENTION

Video displays using cathode-ray tubes (CRTs) have been widely used for several decades, although many problems in CRT technology still remain. Picture size is still limited, making group viewing difficult. The actual display units have a picture size of at least 19" (measured diagonally) which is about the smallest "comfortable" size for family home viewing. However, these remain large and cumbersome, hovering ominously over the room, collecting dust, consuming valuable floor space and creating an aesthetic eyesore. Additionally, a television convenient to watch sitting up becomes inconvenient to watch from a bed. In addition to these mere inconveniences, health hazards from X-rays emanating from color sets, eye strain related to flicker rate, sharp color peaks produced by phosphors and the dangers of high voltage and possible picture-tube implosion remain problems which have not been adequately addressed.

Image quality problems of CRT-based video displays include color distortion, lowered resolution from the influences of the earth's magnetic field, convergence error, age or misadjustment and decreased resolution due to visual artifacts such as scanning lines, phosphor stripes, and phosphor dots which are inherent in all such TV displays and are particularly visible when viewing at close range. These visual artifacts provide a poorer image quality than images in movie theaters.

"Projection televisions" have been developed and commercialized in recent years. Although such televisions have solved the small viewing screen problem, other existing problems have been exacerbated and new problems have been created. Projection televisions are more expensive than standard, direct-view televisions and are more cumbersome, heavier and larger so that portability is impractical. Two types of projection television systems have become popular: one using three CRTs with projection lenses and the other using an oil film scanned by an electron beam.

The CRT-based system remains very dim, requiring a dimly-lit viewing environment and a costly special screen which provides a very limited viewing angle. The three CRTs produce images in the primary colors: blue, green, and red. The oil-based system, often referred to as an Eidophor System, has three "scanned oil elements" which have a relatively short life and uses an external light source. In either system, these images must be converged onto the screen to form one color picture. Due to the curvature of the lenses and variations in the performance of the circuits in either system, proper convergence is not easily achieved and sometimes requires up to a half hour of additional set-up time. If the projector or screen is moved, the convergence procedure must be repeated. The CRTs are driven with a high anode voltage to obtain as much brightness out of them as possible. Increasing the anode voltage further increases the X-ray hazard and lowers tube life and other problems associated with high voltage. The three tubes increase the danger of tube implosion.

Many attempts have been made through the years to solve the above-mentioned problems by using a "light valve" based system. This type of system uses an external light source which can be as bright as desired, with a light valve to modulate the light carrying the picture information. The research and experimentation to develop a workable light valve has been focused upon using different optical effects coupled with physical effects and finding or producing various materials to accomplish the desired effects in a light valve. With the exception of the oil scanning type of system, no other light valve system has proven feasible or economically viable.

Experimentation has also been performed on a laser system which scans out an image on a viewing screen in the same way an electron beam scans the image onto the face of a CRT. The laser system is much too large to be portable, very complex to use and maintain, extremely expensive, very dangerous and has proven too dim for large images.

The various light-valve system attempts have mainly utilized: crystals, such as quartz, Potassium Di-Hydrogen Phosphate, Lithium Niobate, Barium Strontium Niobate, Yttrium Aluminum Garnet, or Chromium Oxide; or liquids such as Nitro Benzene; or liquid crystals of the smectic or nematic type; or a suspension of particles such as iodoquinine sulphate in a liquid carrier. These and other similar materials have been used to capitalize on one or more optical effects including: electro-optical effects such as creating a rotated plane of polarization or altering the index of refraction of the material due to an applied electric field, magneto-optical effects using an applied magnetic field, electro-striction effects, piezo-optical effects, electrostatic particle orientation, photo-conductivity, acousto-optical effects, photochromic effects, laser-scan-induced secondary electron emission, and various combinations of these effects. Unfortunately, such light valves have proven impossible to manufacture inexpensively, in large quantities and with a large aperture and have often been toxic, dangerous and inconsistent in production quality.

In all light valves, different areas must be supplied different information so that a different amount of light would emerge through each area, adding up to a complete picture across the total beam of light. This requires the materials to be scanned by a laser or electron beam or for a tiny criss-cross of electrically conductive paths, i.e., a matrix, to be deposited on or adjacent the material to be addressed. In scanning beam systems, problems included outgassing, erosion of material and image information loss due to the bright and hot illuminating light. The electrical matrix system has proved difficult to engineer, requiring good conductivity characteristics with extremely fast switching circuits, which were impractical at the high voltages required to activate a given area of material. The most frequently used system (developed to address small areas) which has shown promise is often referred to as electronic multiplexing.

Electronic multiplexing only works with low-voltage requiring materials such as liquid crystals. With this method, all pixel addresses are x and y coordinates on the conductive grid. To activate a given pixel area a specific amount, different voltages must be applied to the x and y conductors so that, where they meet, they together exceed a threshold and modulate the area. A major drawback to such multiplexing is crosstalk, where surrounding areas are affected by the local electric field, causing false data to influence surrounding pixels. Crosstalk is also a problem with electron and laser scanned materials and reduces contrast and resolution as well as color saturation and accuracy.

Since these light valves have very little persistence and one pixel area is activated at a time, substantially less light passes through the screen to ultimately arrive at the viewer since all pixels are "off" most of the time. This characteristic wastes light, produces a dimmer image with poorer contrast, and generates more heat because of the brighter source necessary to compensate. High refresh rates are impractical because that would require faster switching times and faster responding material.

"Pocket TVs" are constructed today using the electronic multiplexing technique, but because the picture is small, the light source bright and the ambient conditions restricted, these defects are not very noticeable. However, when an image is projected, the defects are greatly magnified and become unacceptably noticeable as the large pixels form very noticeable squares and rows detracting from image quality. Contrast is then also noticeably very low—i.e., no "black" is possible. To further decrease contrast, the bright, hot lamp could heat up the LCD, causing a "hot spot" in the center of the image, spreading out in a Gaussian-like pattern. This lowers contrast further. Color rendition is also measurably poorer in such pocket TVs than with a CRT.

To address these and other problems associated with prior art video display devices, it is an object of the present invention to provide an adjustable size video image which can be very large, yet possess high quality and sufficient brightness to be visible in a normally lit room.

Furthermore, an object of the invention is to create a video display device which utilizes a specially constructed LCD light valve, an independent light source and optics for front or rear projection onto an internal or external screen.

Another object of the invention is to produce such a display with high resolution and contrast, and with more accurate color rendition, approaching that of a CRT, while reducing the strain associated with flicker sharp color peaks created by phosphors, and eliminating the appearance of stripes or pixels.

A further object of the invention is to produce a small, lightweight, portable system, having a long maintenance-free operating life, which is operable in conjunction with or without a large screen and can be mass produced relatively inexpensively.

Yet another object of the invention is to produce a system which requires no convergence or other difficult adjustments prior to viewing.

Still another object of the present invention is to produce a system which has no danger of emanating X-rays or tube implosion and operates with relatively low voltage.

An additional object of the invention is to produce a system which does not require a special screen, can be easily projected on a ceiling, and can be viewed comfortably at relatively wide angles.

A further objective of the invention is to produce such a system capable of three-dimensional projection.

SUMMARY OF THE INVENTION

These and other objects of the invention which will become apparent hereafter are achieved by "AN ACTIVE MATRIX LCD IMAGE PROJECTION SYSTEM" employing a liquid crystal display (LCD) device for the formation of an image utilizing an "active matrix" for electronically addressing and activating each of the liquid crystal elements in the matrix. The matrix is "active" in that a separate transistor or other suitable semiconductor is deposited adjacent to each picture element or "pixel" to control each pixel, and a storage element is employed to store the respective pixel control signal. The video display-system further comprises a direct projection optics arrangement which includes a light source for illuminating the LCD, optics which collimate light from the source, and a lens system for projecting and focusing an image from the LCD onto a viewing surface.

An important aspect of one embodiment of the invention is the use of a dichroic mirror system to superpose color pixel triads from a single, multicolored LCD to form full-colored pixels with spaces between them.

Another aspect of the invention relates to the filling of spaces between pixels. These spaces may be filled using a 4-mirror system, in which a first striped mirror pair duplicates each pixel and the image is shifted horizontally into the spaces which previously existed between pixels. A second mirror pair duplicates the newly created rows of pixels and shifts the original and the duplicated pixel images vertically to fill the remaining spaces between pixels.

Other methods are described of filling spaces between adjacent pixels through the use of an expanding lens array and a collimating lens or a second collimating lens array to expand and collimate individual images of the pixels.

The invention will be better understood by the Detailed Description of the Preferred Embodiment in conjunction with the appended drawings, of which:

BRIEF DESCRIPTION OF THE DRAWINGS

FIG. 4 is a schematic view of a projected image of superposed "full color pixels";

FIG. 5 is a schematic view of a four-mirror system depicting a method of filling in spaces between adjacent pixels;

FIG. 12 is a magnified schematic view of a "stepped thickness" LCD cavity showing the different thicknesses of LCD that red, green, and blue light traverse through;

DETAILED DESCRIPTION OF THE PREFERRED EMBODIMENT

Figure 1:
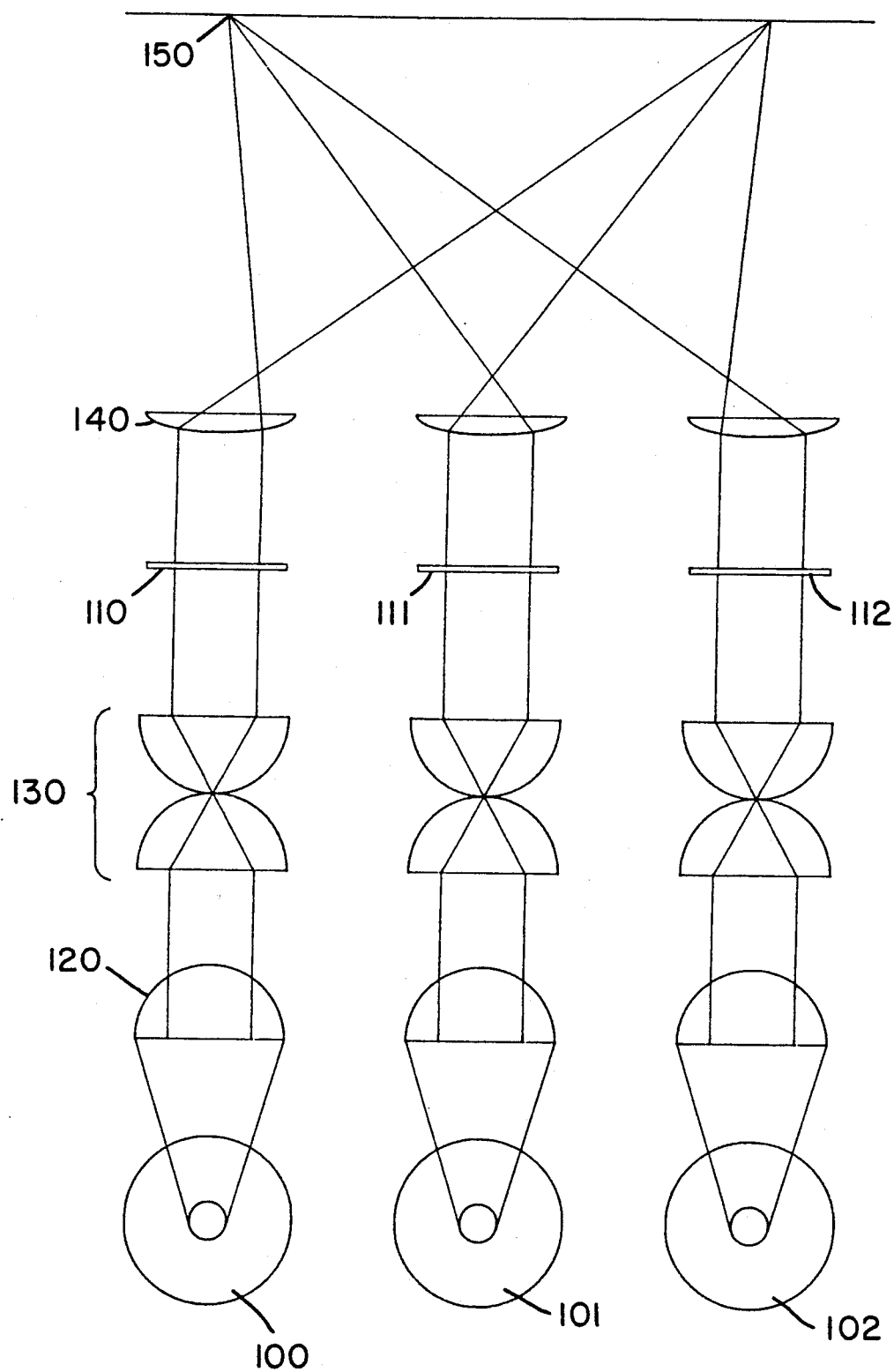
FIG. 1/ is a schematic view of the invention depicting three LCDs projecting their image onto one common screen.

Of all video display systems researched and operated thus far, the one that shows the greatest potential for solving the above-mentioned problems is an LCD display system, utilized in transmissive or reflective mode, taking advantage of the polarization/rotation or scattering capabilities of liquid crystals, with a conductive matrix for addressing. Various changes must be made to current video display designs, which use electronic multiplexing, to eliminate the current problems.

Although present LCD TV displays using electronic multiplexing produce a satisfactory small image, when such images are projected to a large picture, the transmitted light never reaches zero, causing low contrast. Additionally, with electronic multiplexing, crosstalk and electronic "bleed through" to neighboring pixels reduces resolution and color fidelity. If a picture is to be a mosaic of red, blue and green pixels, each pixel must acquire a precise amount of current to reproduce the brightness of each picture element's originally broadcast brightness, as well as its color rendition. Additionally, light is wasted and the picture appears dim with each pixel being turned on for only art of a scanning field. The image cannot be refreshed and so flicker, as well as brightness efficiency, is dependent on the persistence of the LCD, which is not adjustable.

Consequently, there is proposed a new idea for a video display system which includes an active matrix LCD This idea includes the deposition of a thin film transistor next to each pixel and the use of a storage element at each pixel, creating an "active" rather than "passive" matrix. Instead of present day multiplexing, each transistor would receive a gate signal, turning it on and allowing the conduction of a signal voltage to the desired pixel. When the transistor is switched off, the pixel electrodes with liquid crystal material between them act as a capacitor storing the charge and maintaining the state of activation of the liquid crystal material until changed by a new signal. This way, each pixel can be addressed, turned on (to transmit or reflect light) and will remain on until data for the next frame is presented. With this system, no interlaced scanning need be used and flicker can be eliminated. Each pixel will be on for the entire length of a frame, immediately changing to the appropriate level of transmissivity or reflectivity for the pixel in the next frame. Each pixel will be on (the desired amount) all the time, allowing the highest throughput of light from the external light source.

This "active matrix" will allow more brightness and less heat for a given level of brightness. Addressing each transistor separately and letting the transistor determine the current to each pixel, in addition to introducing some "dead space" between pixels, assures that each pixel receives the correct amount of current without any crosstalk from neighboring pixels. By allowing for a "dead space" between pixels, necessary for the placement of the transistor and/or conductive pathways, the system eliminates the crosstalk problem. These dead spaces may be in the area of liquid crystal "overlap" where electric fields from neighboring pixels could co-mingle and produce false data, reducing contrast and distorting the color mix mix. Placing an opaque, black reflective or other over these areas serves at least two purposes: it stops passage of improperly modulated and un-modulated light from passage to the screen; and it protects the transistor from damage due to irradiation from the intense light and heat. The covered area may be a fraction of the size of a pixel.

The use of such a thin film transistor active matrix modulation system eliminates many of the problems concerning contrast, brightness, flicker, and color rendition present in prior art systems.

State of the art methods of deposition of semi-conductor material can be utilized to mass-produce the present active matrix system.

This new LCD light valve is used in conjunction with direct projection optics. In the preferred embodiment, depicted in FIG. 17, a light source 1700 is collimated by collimating optics 1710, which could comprise a spherical or parabolic reflector 1720, a condensing lens 1730, and collimating lenses 1740. The LCD light valve 1750 is illuminated by this collimated light, creating a full-color optical image thereupon. Projection optics 1780 then focusses this image on a viewing surface 1790. Optionally to improve the quality of the projected image as explained further herein, subsystem 1760 is used to superpose pixels of color triads forming full-color pixels with spaces between them. Further, subsystem 1770, also explained herein, may be used to fill in the spaces between pixels.

A source of lowered resolution, contrast, and color and gray fidelity levels is heat generated by the required projection bulb. The heat, like the light, irradiates the LCD in a Gaussian-like pattern, causing a "hot spot" in the center of the LCD. Excessive heat could damage the LCD. Even if the damage threshold is not reached, image degradation, as just described, could still occur because the LCD expands, increasing the distance, light must travel through the LCD. This changes the rotation of the plane of polarization of the light passing therethrough, throwing off contrast, resolution, and color and gray rendition in a Gaussian-like pattern.

Several steps may be taken to deal with the detrimental effects of heating of the LCD. First, all optics, including the LCD, should be mounted with good contact to large heat sinks, as is done, for instance, with power transistors. Additionally, all optics can be coated with material of proper thickness, such as is done for dichroic reflectors, to reflect the infrared (IR) spectrum. IR reflecting mirrors and heat absorbing glass can also be used in the optical path. Additionally, a fluid means such as a liquid or gas in a container, allowing large bodies of index-matched high-boiling-point fluid (liquid or gas), can be used for further cooling. This fluid may be circulating within a contained area or static. Alternatively, instead of transmissive optics, reflective optics such as optics made of metal, can be utilized for further heat sinking and to suppress reflection at IR wavelengths (with anti-reflection coating for the IR).

Figure 16:
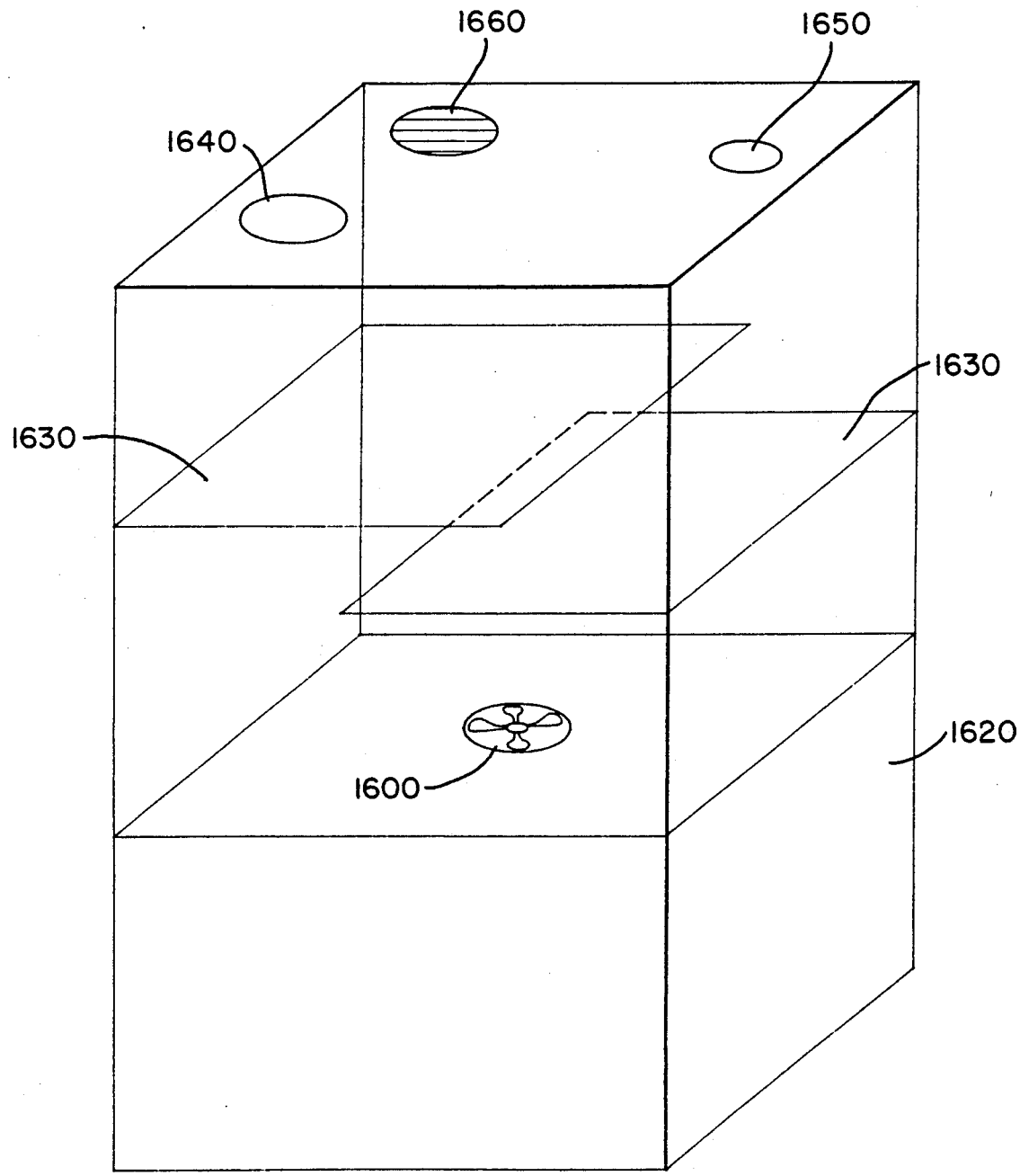
FIG. 16 is an open perspective view of a sound suppression system which may be adapted to the present invention.

The simplest measure that can be taken to cool the LCD, as well as the other components of the system, is the use of a cooling fan or fans. However, a fan can pose a noise problem when the audio volume of the system is at a very low level, particularly in a small room. To suppress the noise, an "air baffle" may be used between the fan and the outlet of for example, a housing for various components of the invention. FIG. 16 shows a sound suppression system, comprising fan 1600 resting on platform 1620. The addition of airflow blockers 1630 forces the air to traverse a curved path with deflection prior to exiting the housing through outlet 1640. The surfaces from which the air reflects are covered with sound absorbing materials, greatly reducing the noise entering the listening environment. Since some noise will still be present at outlet 1640, a further measure may be taken for noise reduction. This measure comprises microphone 1650 which picks up the remaining noise sends it to an amplifier which inverts the phase of the noise by 180 degrees. The inverted noise is played back through speaker 1660. By properly adjusting the volume and phasing of the amplifier, the remaining perceived fan noise could be substantially reduced and made practically inaudible.

Depending upon the brightness of the source utilized and the physical and economic constraints of a given system, some significant Gaussian-like heat pattern could remain at the LCD and could change with time as overall heat builds up during operation. Consequently, an electronic approach can be utilized in addition to eliminate the problem and lower the magnitude of the other remedies recited. Since the degree of rotation of the plane of polarization of the light is not only dependent on the thickness of the LCD that it passes through, but also upon the amount of applied electric field, modifying the electric field in opposition to temperature effects will substantially cancel the distortion, resultant from such effects resulting in uniform performance across the LCD.

Such a control system can be embodied by using a bias voltage, applied differently to different pixels, distributed in a Gaussian-like pattern and controlled by the individual pixel transistors and/or the addressing circuitry. A thermistor or other temperature-sensing device, placed at the LCD, can monitor overall average LCD temperature, adjusting the Gaussian-like bias voltage distribution as the temperature fluctuates, using an electronic servo-circuit. For even more accurate temperature control, a thermistor-type device can be deposited next to each pixel transistor in the space between the pixels, to independently control the heat-compensating bias of each pixel.

Although the methods described so far solve most of the problems mentioned, a satisfactory method of color production must be used and something must be done about the blank spaces between pixels, which would otherwise be magnified in the projected image.

It will now be described how a simple, compact, and inexpensive, full-color television projection system, may be constructed using a single "full-color" LCD. Previously, full-color direct-view-video image display, not using projection, had been accomplished with a single "full-color" LCD. When such images were enlarged by projection, however, several problems became very apparent.

In a standard CRT based TV system, red, blue and green pixel data are sent to adjacent red, blue and green phosphor spots on the CRT face. Analogously, in a direct-view LCD TV system, red, blue and green pixel data are sent to adjacent areas of the LCD. These areas are then covered by red, blue and green filters to appropriately color the light passing through those LCD pixel elements.

Figure 15B:
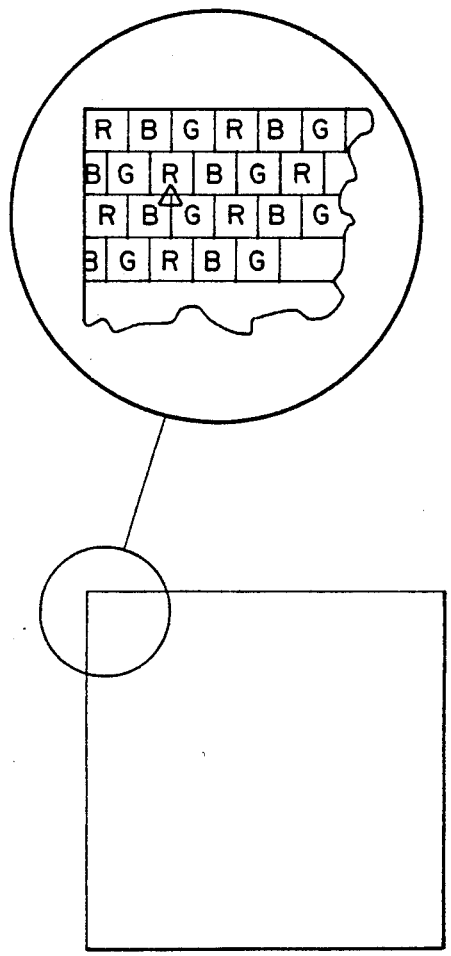
FIG. 15b is a schematic view of an alternate arrangement of pixels in which three pixels of a color triad are indicated by a triangle.
Figure 15A:
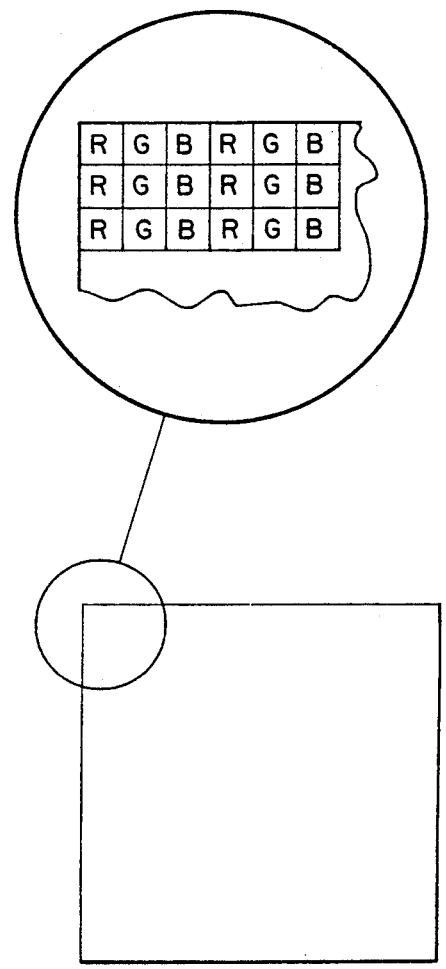
FIG. 15a is a schematic view of color filters on corresponding color-pixel areas in a full-color LCD.

FIG. 15a depicts a simple arrangement of color filters on corresponding color-pixel areas in which pixels of a given color are located above one another creating vertical color stripes. Three horizontally adjacent pixel areas make up a triad which represents a single color pixel from the actual image. FIG. 15b depicts an alternate arrangement of pixels in which the three pixels of a color triad are arranged to form a triangle. Such small, closely packed red, blue and green spots of light create the illusion of color in a scene as they are supposed to appear. However, when this image is magnified by projection, each adjacent red, blue and green pixel no longer merges to produce properly colored areas. Instead, they appear as disjointed red, blue and green areas, detracting from the appearance of a naturally colored image. Furthermore, in systems according to the invention, the spaces between adjacent pixel areas in the LCD which allow for the deposition of thin film transistors and conductive paths necessary to create an "active matrix" are magnified as well, further creating a disjointed, disruptive, unnatural looking image.

Figure 9A:
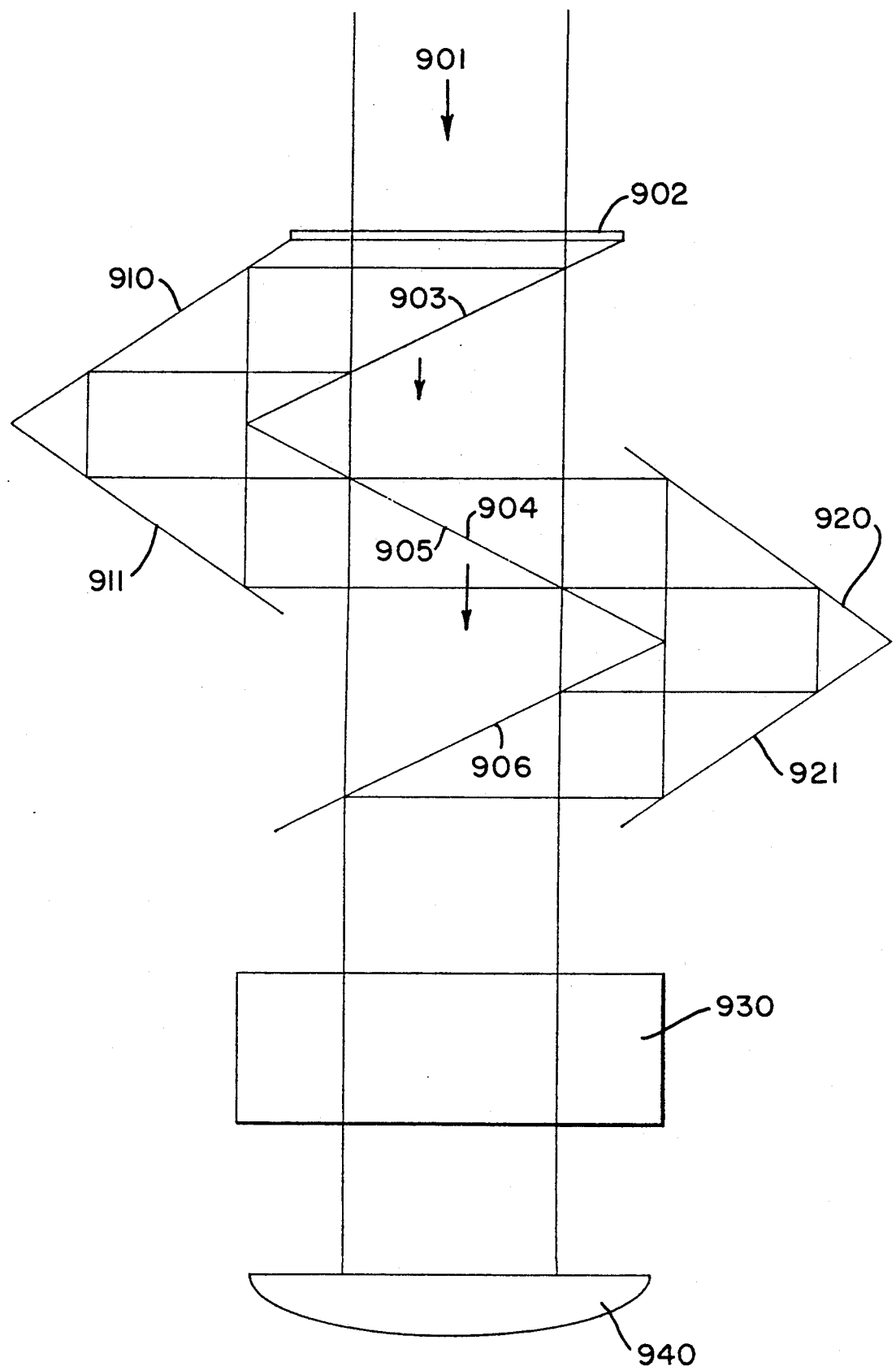
FIG. 9a is a schematic view of a dichroic mirror system of the preferred embodiment of the present invention.

The problem of the appearance of disjointed red, blue and green spots instead of actual colors, can be eliminated by the use of a dichroic mirror system as depicted in FIG. 9a. Assuming the pixel arrangement of FIG. 15a, individual red, blue and green pixels can be made to overlap by the following arrangement: collimated light 901 passes through the full-color LCD 902 and hits dichroic mirror 903 which reflects only the blue image. The remaining red and green images pass through dichroic mirror 903, hitting dichroic mirror surface 904 which reflects only the red image, allowing the green image to pass through. The blue image reflects off front surface mirrors 910 and 911 and then off dichroic mirror surface 905 which reflects only blue light. Here the blue image rejoins the green image. By adjusting front surface mirrors 910 and 911, the blue pixels can be made to overlap the green pixels. The red image reflects off front surface mirrors 920 and 921 and then off dichroic mirror 906, which only reflects red light. At this point, the red image rejoins the blue and green images and by adjusting front surface mirrors 920 and 921, the red pixels can be made to overlap the already joined blue and green pixels. At this juncture, we have a full color image with large spaces between pixels as illustrated in FIG. 4.

If individual colored pixels are arranged on the LCD as shown by FIG. 15b, in which a color triad forms a triangle, bringing the red and blue pixels together as just described will not allow them to superimpose on top of the green pixels since the green pixels are vertically displaced from their corresponding red and blue pixels. Consequently, this type of pixel arrangement requires an additional dichroic mirror path similar to the paths used by the red and blue light. This is depicted more clearly in FIG. 9b, which is a side view of the system in FIG. 9a modified to include an additional light path.

Collimated light 901 passes through full-color LCD 902 as before. However, the distance between LCD 902 and dichroic mirror 903 is increased to allow for the insertion of dichroic mirror 950 which reflects green light and transmits red and blue light. As before, 903 reflects blue light and transmits red light. Now, mirror surfaces 904 and 905 are front surface mirrors. Mirror 906 reflects red light and transmits blue light. As before, mirrors 910, 911, 920 and 921 are front surface mirrors. In addition, mirrors 960 and 970 are also front surface mirrors. Mirror 980 is a dichroic mirror which reflects green light and transmits red and blue light. By this modified arrangement, proper separation of mirror 910 from mirror 911 and separation of mirror 920 from mirror 921 will still cause the overlap of the red and blue pixels. Additionally, proper separation of mirrors 960 and 970 will cause the green pixels to overlap the already joined red-blue pixel pair. This overhead mirror arrangement may also be used with the color LCD whose pixel arrangement is as depicted in FIG. 15a with the spacing between mirrors 960 and 970 adjusted to prevent vertical displacement of the green pixels since they are already in line with the red and blue pixels. The separate mirror path for the green light makes the distance traversed by each color through the system equal, which is important because the light, although collimated, still expands somewhat with distance traveled. Consequently, if different color components traverse different distances, then when they are rejoined into full-color pixel images, the color component with the shorter path would create an image of a pixel that is smaller than the image of the other colored pixels, creating a poorer quality color image. Now the image can pass through 930 which may be either a "striped mirror pair" system or a lens array system, described hereafter, to fill the spaces between pixels for final projection by projection optics 940.

This combined system for superimposing corresponding color pixels to form "full-color pixels" and then filling in spaces between pixels by enlargement or duplication of pixels may also be useful on a CRT-based video projector to improve the subjective resolution.

Various other combinations should now be apparent such as using three full color LCDs in a projection system where the red pixels of one LCD overlap the green pixels of a second LCD which overlap the blue pixels of a third LCD. This also creates full-color pixels, eliminating the need for the mirror system of FIG. 9. The three LCD system allows three light sources (although one could be used) for triple the brightness. A three LCD system is depicted in FIG. 1.

Figure 2:
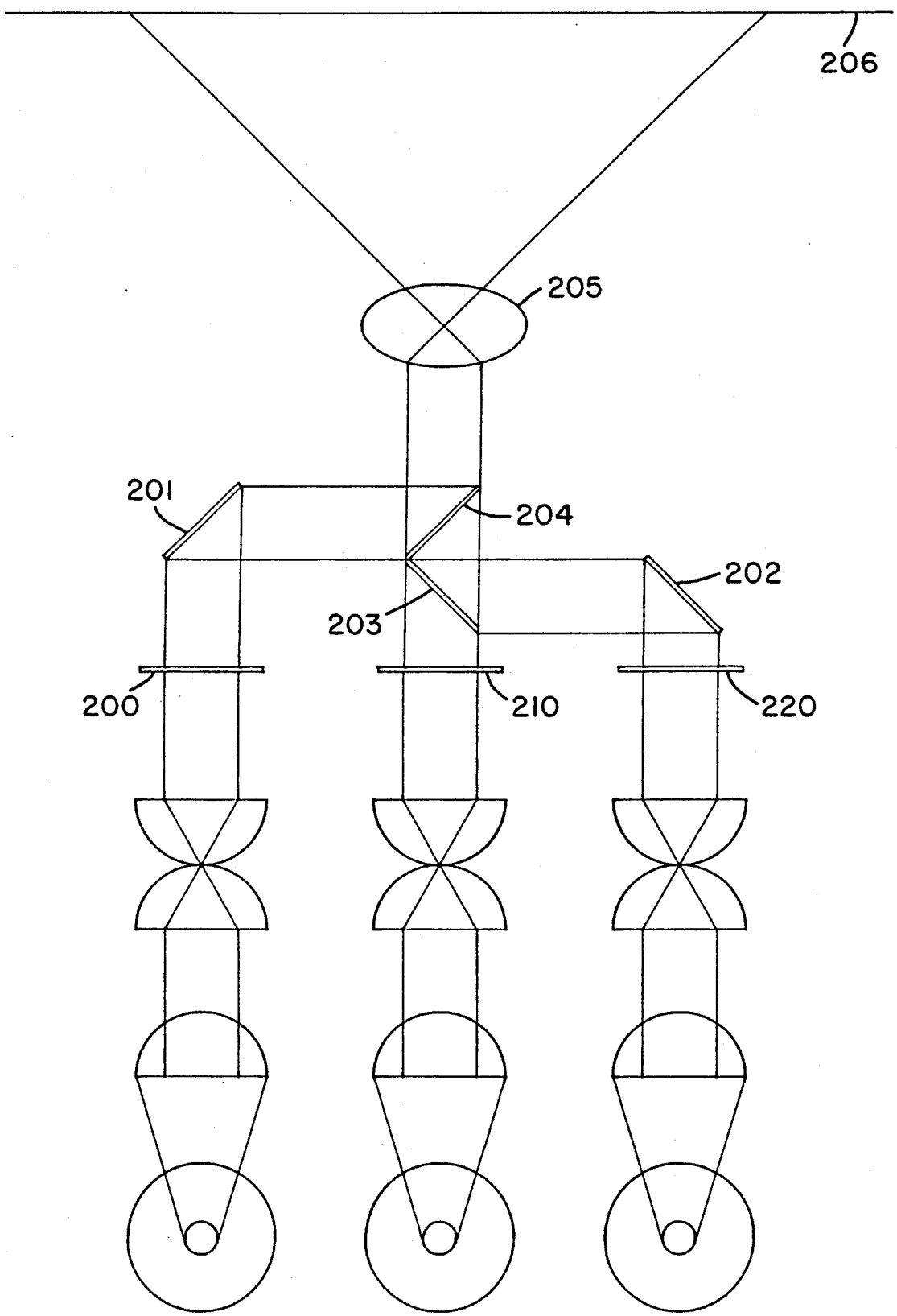
FIG. 2 is a schematic view of a modified embodiment of the present invention in which the images of three LCDs are internally superposed and projected onto a common screen employing one set of projection optics.

FIG. 1 shows three LCDs, one displaying red 110, one green 111 and one blue 112 picture data. Each of the LCDs is illuminated with light of the appropriate color (100, 101, 102). The red light from source 100 is collected by condenser 120 and collimated by collimating optics 130. Projection optics 140 focuses a red picture on screen 150. Similarly the green and blue images are projected and made to converge on the screen, forming a full color image. The disadvantage of the full color system employing 3 LCDs is that adjustments must be made to the optics to converge the images whenever the projector or screen is moved. This problem is eliminated by the use of dichroic mirrors and a single projection lens as shown by FIG. 2. Red image information from LCD 200 reflects off front-surface mirror 201 to dichroic mirror 204 which reflects red light but passes blue and green light. Blue image information from LCD 220 reflects off front surface mirror 202 and then off dichroic mirror 203, which reflects blue but permits green light to pass, and then passes through dichroic mirror 204. Green image information from LCD 210 passes through dichroic mirrors 203 and 204. Thus, a totally registered full-color image is projected by projection optics 205 to form an image on screen 206. Convergence is always perfect, regardless of repositioning of the projector or screen. Of course, a plurality of monochrome and/or full color LCDs could be used to produce a video display. A disadvantage of using a plurality of LCDs is the increased cost of the multiple LCDs.

Figure 3:
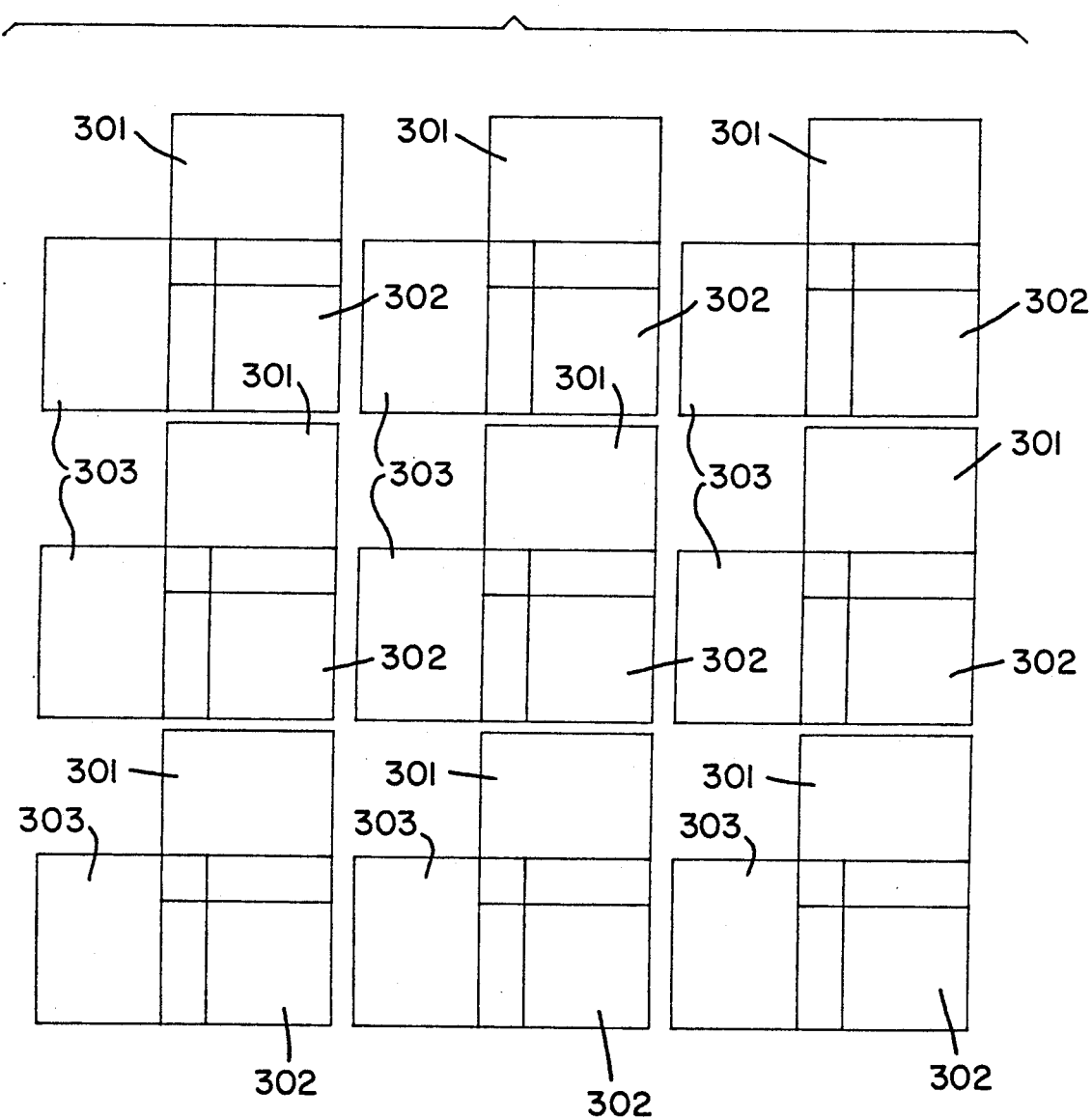
FIG. 3 is a schematic view of various pixels with reduced spaces between them.

With either one lens or three, the three images can be slightly offset to fill the spaces between pixels. As an example, see FIG. 3 wherein blue pixel 301 may be slightly higher than red pixel 302 and green pixel 303 can be slightly to the left of each red pixel 302. Many other arrangements of offsets of the different colored pixels are possible and all serve to decrease black spaces in the image, but at the same time, the individual colors become more visible at close range. Although such an image may be acceptable, a better solution, whether one or more LCDs are used, is to have all pixels exactly superimposed in triads (red, green and blue together forming "full-color pixels") with spacing between such pixel triads (arranged by proper LCD manufacture), preferably, although not necessarily, to be equal to the dimensions of a pixel. Then the pixel images can be duplicated or expanded to fill the spaces exactly, creating a "continuous image". In FIG. 4, each pixel 401 is a superposition of a corresponding red, blue and green pixel. 402 represents spaces which need to be filled.

Figure 6:
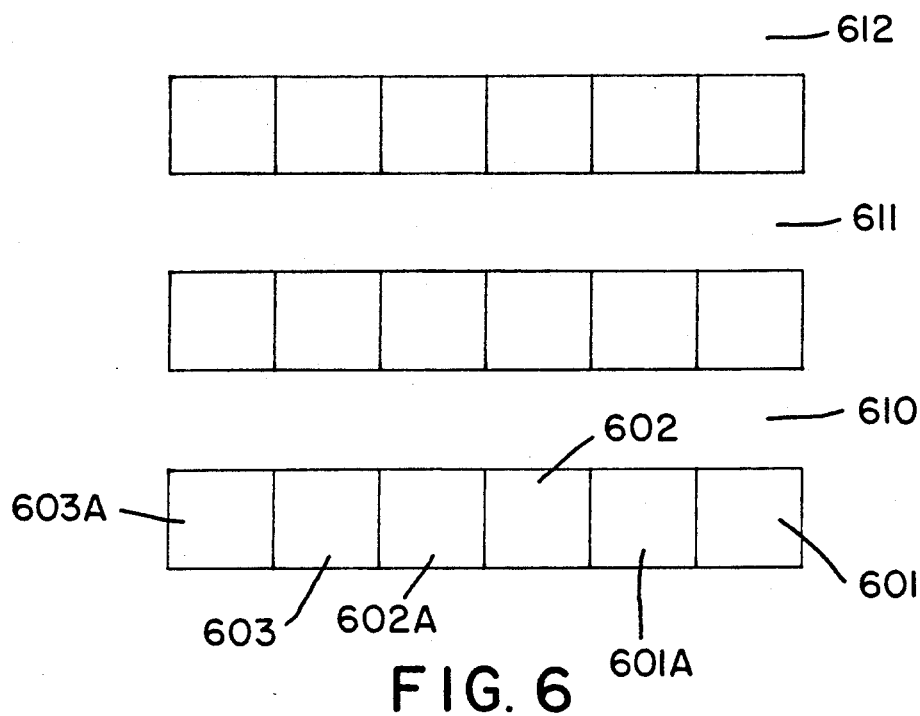
FIG. 6 is a schematic view depicting the filling of spaces between pixels by the first two mirrors (a "striped-mirror pair") of the four-mirror system of FIG. 5.

Whether a "full-color" LCD or multiple "monocolor" LCDs are used, the use of an "active matrix" could increase the space between pixels. A preferred method of filling the spaces is by the proper use of mirrors. To make a mirror system that duplicates the pixels in the proper places with minimum waste of light, a special "striped-mirror system" can be used. One such configuration is shown in FIG. 5. Light containing full color image information 501 (laid out as indicated in FIG. 4) hits a "striped mirror pair" labeled as 502 and 503. This causes the entire image to be duplicated and shifted horizontally the width of one pixel with approximately one-half the brightness of the original image (which is also reduced to one half of its original brightness), filling the spaces between pixels in the horizontal rows as shown by FIG. 6. Vertical rows 601A, 602A, and 603A are duplications of vertical rows 601, 602 and 603 respectively. The combined (original and duplicated) image existing in space 504 of FIG. 5, then passes through a second "striped mirror pair" 505 and 506, which duplicates the image but shifts it vertically the height of one pixel. This produces two images of equal brightness, one above the other, filling in the horizontal rows indicated in FIG. 6 as 610, 611, and 612. Thus a "solid" image is created with no blank spaces. Eliminating blank spaces, separately colored pixels, and the distinction between pixels improves image resolution even above today's CRT images at close range, since CRTs have discernable lines, pixels, and spaces.

Figure 7:
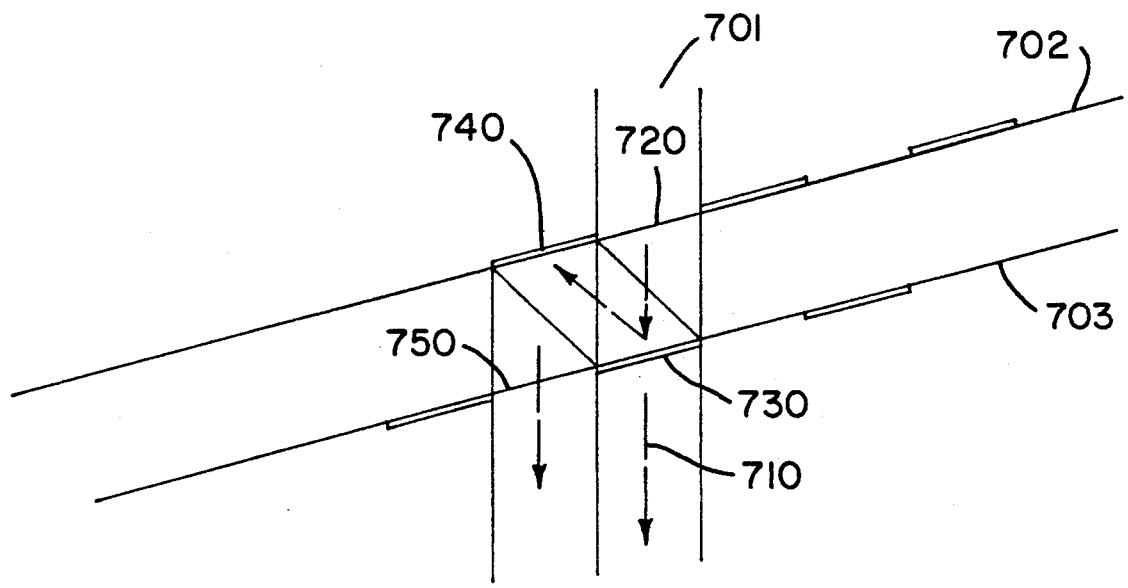
FIG. 7 is an enlarged schematic view of a "striped-mirror pair" of the four-mirror system of FIG. 5.

A "striped mirror pair" is better understood by reviewing FIG. 7. Light from a single pixel 701 impinges upon a "clear" space 720 on the first mirror 702 of the mirror pair. This first mirror is made of glass, plastic, or other suitable material which is AR coated over the visible spectrum and coated on its opposite side in stripes of a suitable reflective material such as aluminum or silver. The striped coating may be accomplished by, for instance, vacuum deposition with a "striped mask over the glass". Alternatively, the glass can be coated with photo-resist and exposed to a projected image of stripes of the desired size. After development, the glass will be exposed for metal vacuum deposition only in the desired stripes. After deposition, the remaining resist could be peeled or dissolved away, leaving the required clear stripes.

The second mirror 703 of the pair also has alternating clear and reflective stripes. On this mirror however, the reflective coating is thinner, creating partial mirrors instead of full mirrors. The percentage of reflectivity is adjusted so that the two pixel images which emerge are of equal brightness.

Light from pixel 701, after passing through space 720, impinges on partial mirror 730, creating a transmitted beam 710 and a reflected beam which hits mirrored surface 740 on first mirror 702. This reflects light through clear space 750 on mirror 703 creating a second beam 710a which is an exact duplicate of beam 710, except that it is contiguously displaced from beam 710. If the spacing between pixels is not equal to the dimensions of a pixel, the mirrored areas 740 on mirror 702, as well as clear spaces 750 on mirror 703, may be adjusted to the dimensions of the space between pixels.

The overhead view of FIG. 5 shows that "striped mirror pair" 502, 503 which has vertical stripes, is tilted with reference to beam 501 around a "vertical tilt axis" to create a horizontally displaced duplicate image, and "striped mirror pair" 505,506 which has horizontal stripes, is tilted around a "horizontal tilt axis" (which is perpendicular to the tilt axis of the first "striped mirror pair" and to the beam 501), so as to create a vertically displaced duplicate image.

Figure 8A:
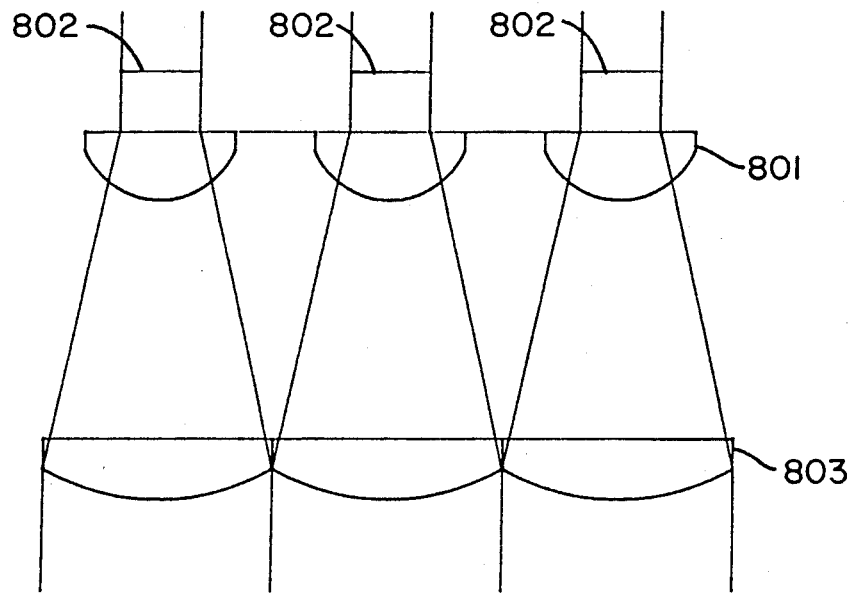
FIGS. 8a and 8b are schematic views of lens-system embodiments of the present invention.
Figure 8B:
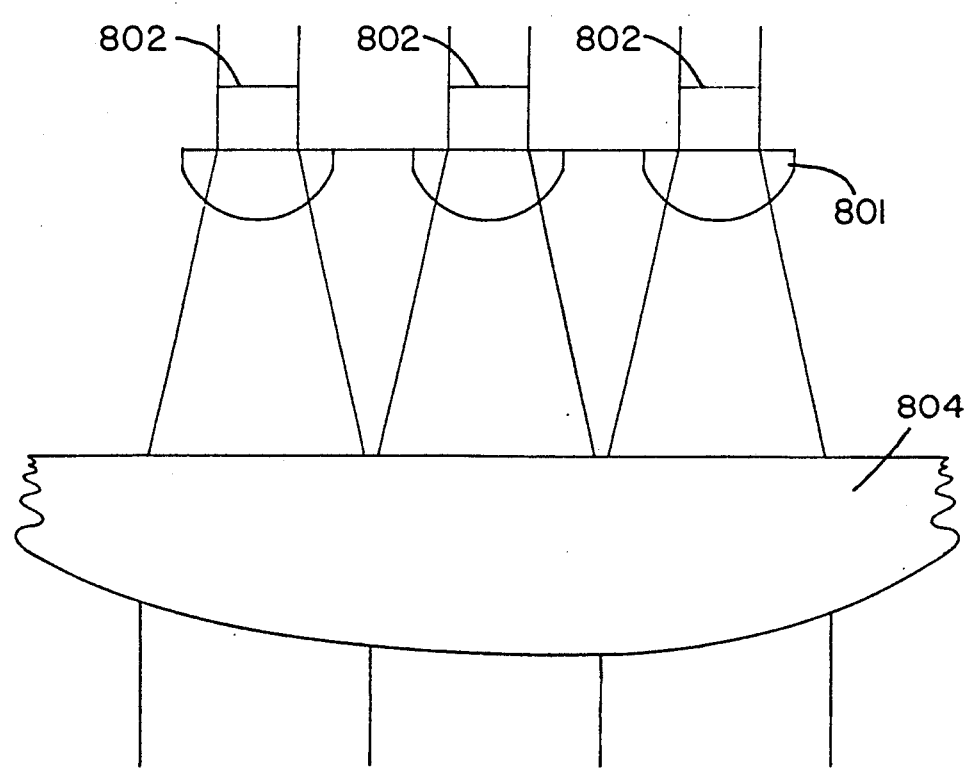

An alternate method of elimination of spaces between pixels, using lenses instead of mirrors, may be used. The alternate method would be especially useful if the spacing between pixels were any different from the dimensions of the pixels. For example, assume that the spacing between pixels was slightly larger than the dimensions of a pixel. A lens array 801 (as shown in FIGS. 8a and 8b) constructed with the same number of lenses as there are "full color" pixels (e.g., the number of color "triads" on the LCDs arranged with the center of each lens over each pixel, 802) could be used to magnify each pixel as depicted in FIGS. 8a and 8b. Then, either a collimating lens array 803 as depicted in FIG. 8a or a large collimating optic 804 as depicted in FIG. 8b could be used to re-collimate the now enlarged and contiguous pixels for projection by suitable projection optics.

If the spacing between pixels varies from the pixel dimensions differently in the vertical than the horizontal, anamorphic lenses would be needed to fill the spaces properly. Although fabrication of small lens arrays is within the state of the art, it is far simpler and less expensive to use more readily available lenticular lenses. These cylindrical lens arrays can be overlapped with their axes perpendicular to one another to accomplish the same goal. The separation of lens function for each orthogonal dimension eliminates the need for anamorphic lenses which are difficult to reproduce accurately and consistently in such small sizes.

Making a "full-color" LCD creates another problem which, although not very noticeable on small displays, creates major problems on a large display. This problem results in a poor contrast ratio and poor color fidelity. To understand and correct the resulting deficiencies, the working of a full-color LCD display must be carefully analyzed.

The following discussion explains the nature of the problem. The transmitted light intensity (TI) from a twisted nematic liquid crystal device, under no applied voltage, with a crystal thickness (d) for any given wavelength ($\lambda$) is dependent on the refraction anisotropy ($\Delta n$) and the liquid crystal twist angle ($\theta$). TI can only equal zero for a few unique simultaneous combinations of values for these parameters. This means that, except for very specific combinations of wavelength ($\lambda$) and thickness (d) for any given crystal, zero transmitted intensity or true "black" will not occur. Thus, if the anisotropy, twist angle, and crystal thickness are fixed, as they are in a conventional LCD (consisting of liquid crystal between two flat plates), only one color can go to black at a time. If a voltage is applied, changing the twist angle, then a different color can go to black. This nonlinearity eliminates the possibility of true contrast in all colors simultaneously; and since perceived color is produced by addition, this eliminates true color fidelity.

Figure 10:
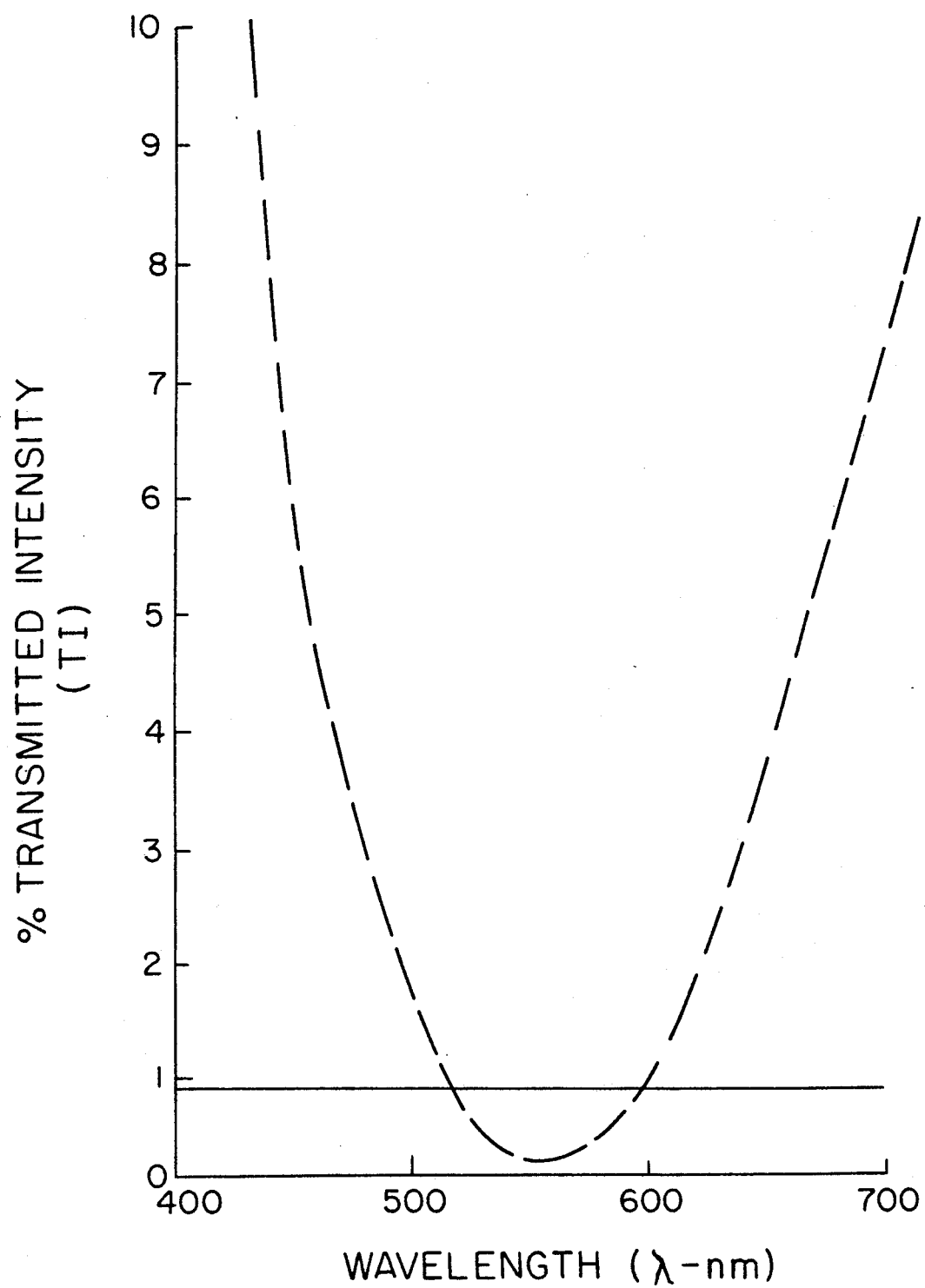
FIG. 10 is a graphical plot of transmitted light intensity over the visible spectrum through two full color LCDs, one with a constant LCD cavity thickness contrasted with a "stepped thickness" LCD cavity.
Figure 11:
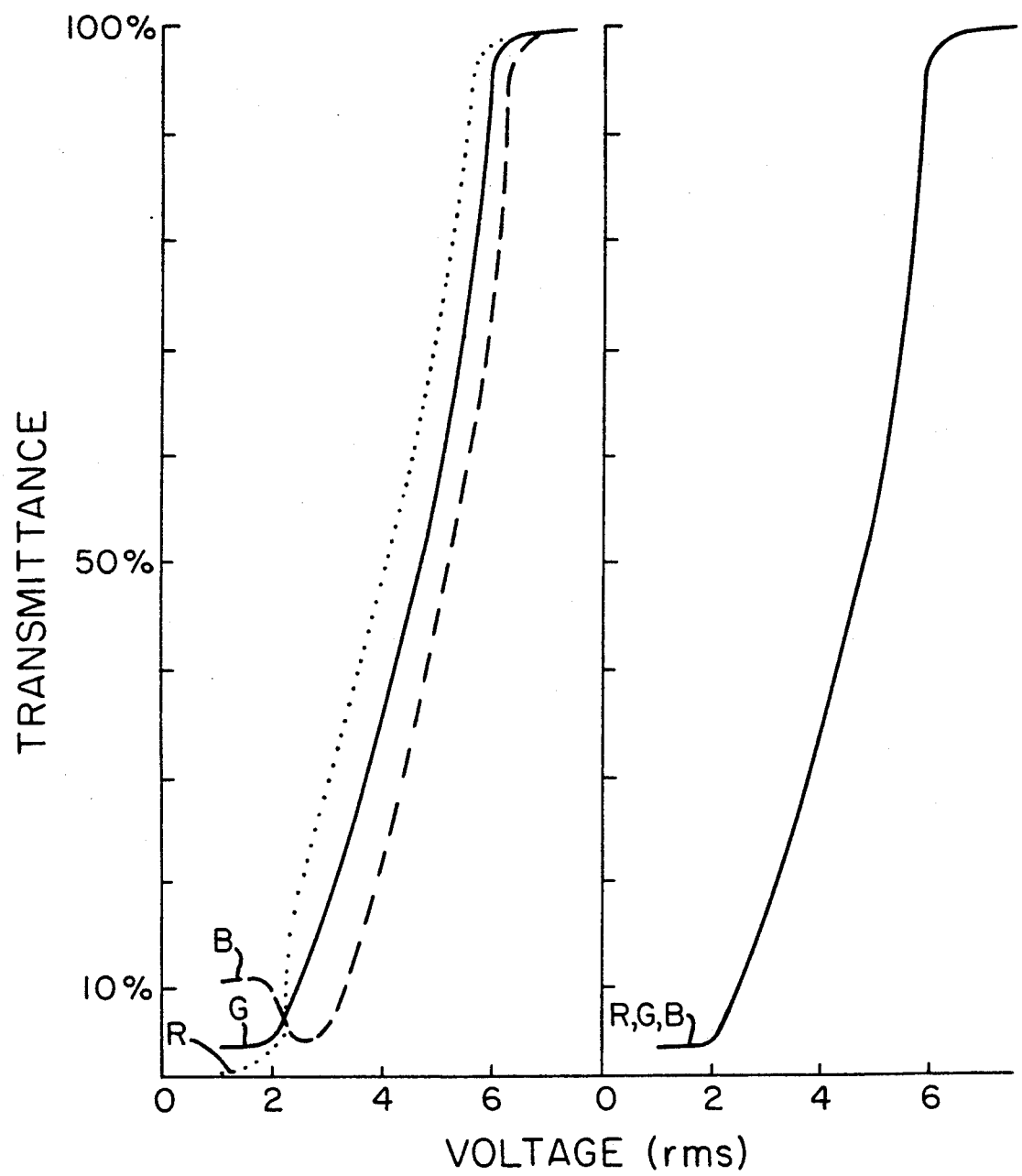
FIG. 11 shows graphical plots of transmitted light intensity vs. applied voltage for three wavelengths used in two full-color LCDs, one for a constant thickness LCD cavity and one for a "stepped thickness" LCD cavity.

To further illustrate this problem, the dashed curve of FIG. 10 shows the transmitted intensity over the visible spectrum of a standard full-color LCD with a given thickness. FIG. 11, plot A shows the non-linear transmittance variations for the three wavelengths used in a full-color LCD of uniform thickness plotted against the voltage. When red transmission is at a minimum, for instance, blue transmission is over 10 percent and green transmission is about 5%. Having no true black results in a low contrast ratio, which is one of the main problems with today's LCDs.

Figure 12:
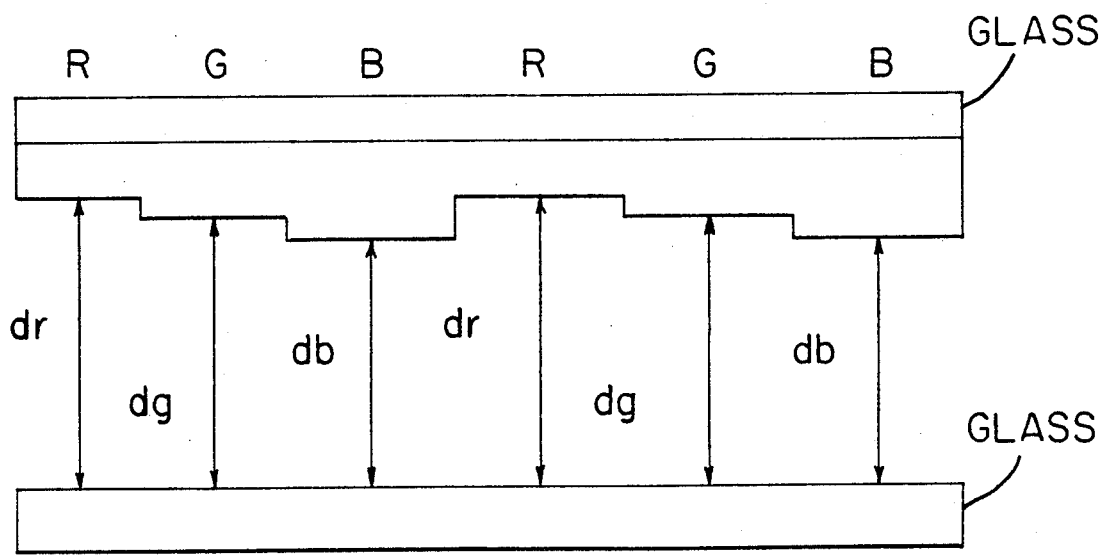

To solve this problem, the crystal thickness (the space between the plates encasing the liquid crystal) can be selected under each color filter such that at exactly zero volts, the proper rotation is imposed on the polarized light for the specific wavelength transmitted by that color filter. By doing this for each of the three sets of color filters used, the minimum amount of light for each color will be transmitted with no voltage applied. This will provide a blacker black and thus, a higher contrast. This result is accomplished if stepped deposition or etching of one plate is done to produce steps as illustrated in FIG. 12.

By using an LCD cavity with such a "stepped thickness" cavity, the crystal thickness-wavelength combination will allow true black for all three colors simultaneously and a linear relationship between applied voltage and transmitted intensity for all colors simultaneously. This is demonstrated by FIG. 10 (solid line) where transmission is nearly zero for all colors simultaneously with no voltage applied; and in FIG. 11, plot B where the transmission for all colors varies with voltage simultaneously.

Figure 13:
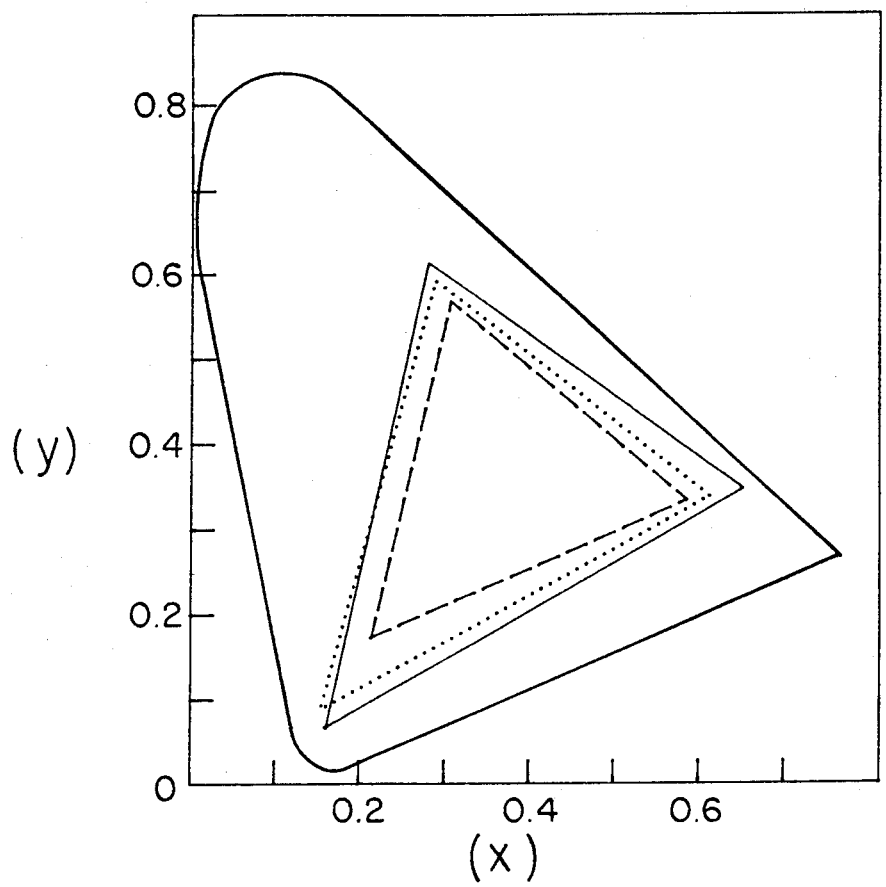
FIG. 13 is a CIE chromaticity diagram comparing color ranges of a CRT display, a conventional color LCD display with a fixed cavity thickness and a "stepped thickness" LCD cavity in accordance with the present invention.

In applicant's demonstration model, using a "stepped thickness" cavity results in a contrast ratio as high as 100:1 and color fidelity approaching that of a CRT. This high color fidelity can be seen in the CIE diagram of FIG. 13 in which the dashed line represents the chromaticity of conventional multi-color LC displays, the dotted line represents the chromaticity of an LC color display with varying crystal thicknesses and the solid line represents the chromaticity of a conventional CRT.

Many projection formats can be used in conjunction with the disclosed video display systems. In addition to curved, direction-sensitive, high reflectance screens, less expensive, more widely dispersive screens can be used with this system. A regular movie screen or even a wall proves adequate with a system of such high brightness. By vertical mounting of the unit or the attachment to the projection lens of a front-surface mirror, the image can be displayed on a bedroom ceiling, for instance. This technique, never before possible, allows for convenient viewing of video imagery while lying in bed, without causing neck or back strain.

Rear-screen projection can be achieved as well. Conventional rear-screen television requires a lenticular lens and a Fresnel lens for adequate brightness. This adds a discernable pattern to the image and produces a limited angle of viewing horizontally and vertically. This type of screen, like a conventional CRT, reflects ambient light to the viewer, creating glare which adds to the viewer's eye strain. With the present system, brightness is much higher, allowing for less stringent screens as well as more streamlined, lightweight and asthetically pleasing display units.

The high brightness allows for the use of a gray matte (i.e. textured), wide dispersion angle screen material. This creates an image that is viewable from practically any angle with uniform brightness and no glare. This type of glareless screen, coupled with the ability to vary the brightness and color temperature of the display by selection of bulb type and operating voltage, may also provide a significantly less fatiguing display for individuals who must spend long hours staring at a video display terminal.

With rear-screen projection, rather than locating the projector several feet behind the screen to allow the image to expand sufficiently to fill the screen, one or more mirrors can be used to reflect the beam one or more times to allow image expansion within a smaller cabinet size. For instance, a cabinet approximately 2-3 feet deep could be used to fill a rear projection screen with a diagonal measurement of 40".

Figure 17:
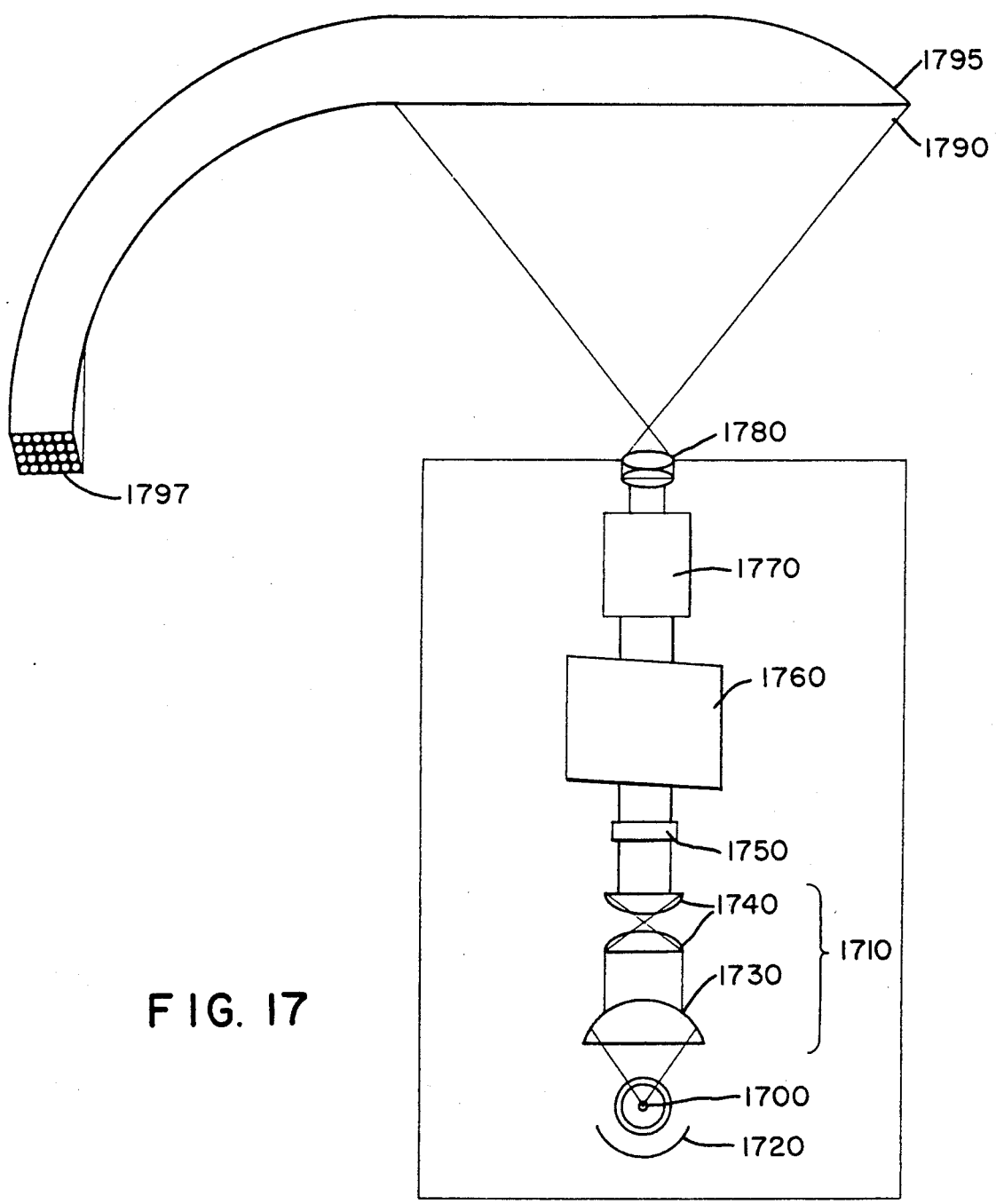
FIG. 17 is a schematic diagram of the preferred embodiment of the invention.

Another method could be used to reduce the thickness to just a few inches. The video projector's image can be focussed onto the input end of a coherent fiber-optic bundle. This is shown in FIG. 17 as 1795 which places input end of the fiber bundle into the projected beam instead of screen 1790. The other end of the fibers 1797 can be polished into lenses or can be coupled to lenses. Thus, each fiber, separated from neighboring fibers, will magnify and deliver to the screen a portion of the image, magnified a pre-determined amount. The composite magnified image will appear continuous, creating a very large image, with only a few inches of cabinet thickness since the fibers can bend. This technique also eliminates the need for any other subsystem to fill in spaces between pixels, such as is disclosed in conjunction with FIGS. 5, 6, and 7 or 8a and 8b.

Figure 14:
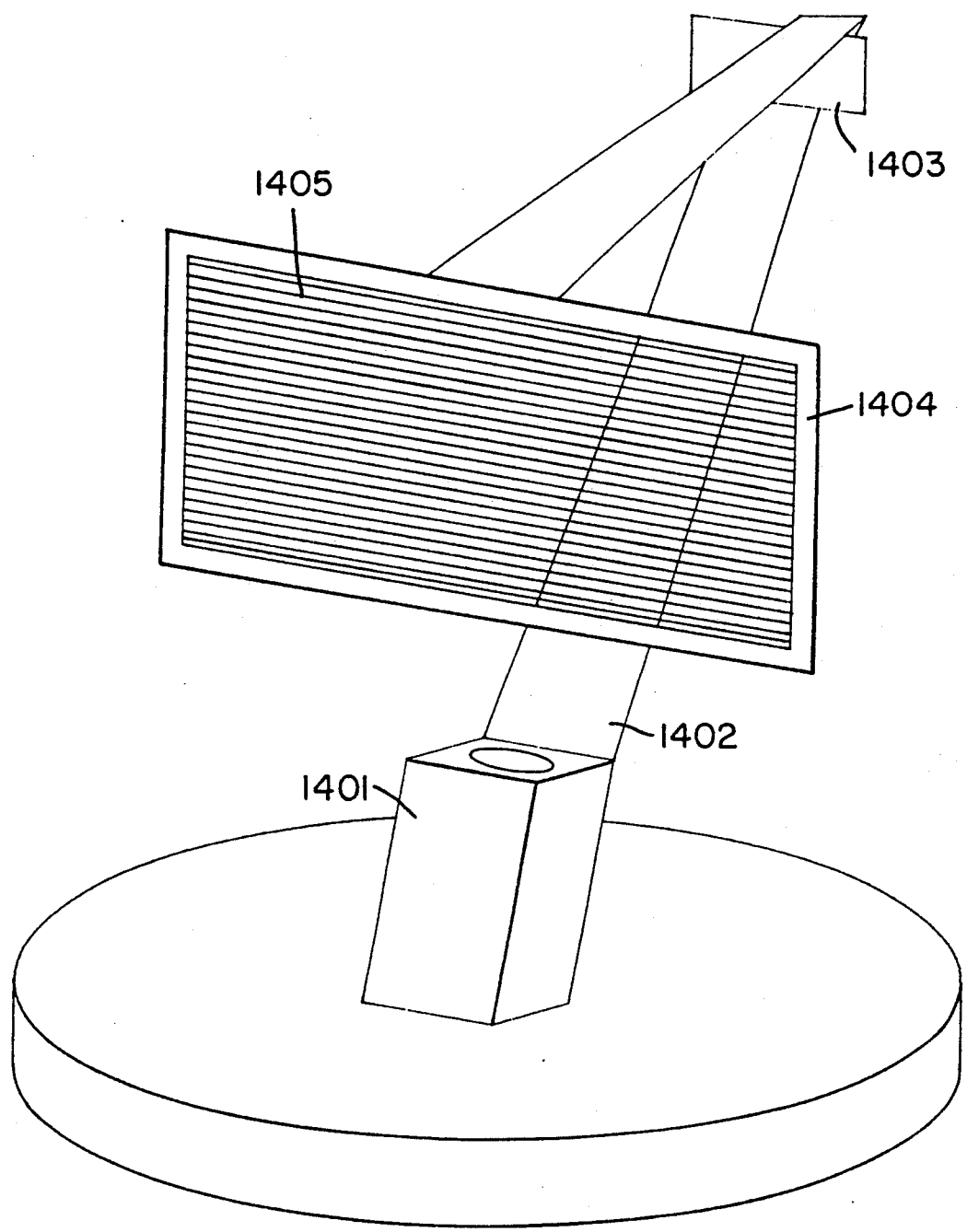
FIG. 14 is a schematic view of a rear-screen projection system utilizing the present invention with a venetian-blind type of rear-projection screen.

An example of a more artistic and futuristic projection system is illustrated by FIG. 14. The video projector 1401 can be mounted to an upright 1402 projecting an image onto a mirror 1403. Mirror 1403 can reflect the image to focus onto a special rear screen 1404 mounted in a frame which appears to be "hanging in space". The screen itself can be made of extremely thin slats 1405 of almost any rear projection material. By mounting an axle onto the ends of each slat with a gear on each, a motor drive can be used to open (lie flat, parallel to the floor) and close the slats (perpendicular to the floor, creating a solid, rear-screen for projection). In the open position the screen will appear as a transparent window in space. When the projection unit is turned on, by remote control, for instance, the slats can simultaneously and quickly close, creating a "video image in space".

Whatever projection method is used, two other important problems exist. Unless the surface being projected upon is perpendicular to the optical axis of the projection beam, the image will suffer from keystoning and blurring of the parts of the picture not precisely focussed on the screen surface. This problem is inherent if the projector is mounted on the floor, on a low table or on the ceiling while the screen is centered on a wall. CRT systems handle keystoning by varying the electromagnetic scan line deflection. The disclosed LCD based system however has pre-defined pixel locations, and thus cannot utilize this technique.

Consequently, a type of anamorphic lens system can be constructed. A zoom lens normally changes the size of a projected image by changing the relative positions between the elements of the projection optics. However, this could also be accomplished if lens elements of different curvatures were used. In the present application, a lens is proposed which has added to it two varying focal length lenses, one above and one below the standard lens, all molded into one lens. The central area of the lens, large enough to magnify the entire LCD, creates a square projected image. But if this lens is raised or lowered with respect to the LCD, the magnification varies, causing a trapezoidal image magnification with either the top or bottom of the image of the LCD being the largest side of the trapezoid. Thus, the lens is adjusted up or down, depending on the angle the video projector is making with the screen and thereby the keystone effect is cancelled.

The variable focus problem can be corrected by a little-known photographic technique known as "Scheimflug correction." If a scene to be photographed has a large depth and a fairly large aperture is used, the only way to get all elements of the scene in focus is to tilt the lens and film plane such that a line drawn through all objects in the scene intersects the line drawn through the film plane at the same point that it intersects a line drawn through the lens plane. In a camera, this is accomplished with the use of bellows. Using the same logic, a mechanical adjustment that tilts the LCD plane and the plane of the projection optics, creating an intersection with a line passing through the screen plane, will cause the entire image to be in focus, even though the projector's beam is not perpendicularly aimed at the screen.

The present invention lends itself to three-dimensional video projection. One method of accomplishing 3-D projection is to use two projection systems with the polarizers of one LCD system perpendicular to the polarizers of the other LCD system. Sending stereoscopic video signals, derived from two displaced cameras for instance, and projecting onto a non-depolarizing screen will allow viewers wearing polarized glasses to see full color 3-D video. A single lens 3-D video projection system can be constructed by placing both LCD systems in one enclosure. Instead of using the second mirror 503 of the first "striped mirror pair" 502 and 503 of FIG. 5, the horizontally displaced spaces between the pixels of one LCD can be filled by the pixels of the other LCD through a simple beam splitter setup, creating a horizontally interlaced, orthogonally polarized 3-D image pair for projection through the single projection lens. Striped mirror 502 can be tilted at a 45° angle with respect to the axis of the light coming from the first LCD. The light from the pixels of this LCD will pass through the clear areas of the striped mirror. The second LCD, whose axis is perpendicular to the axis of the first LCD, reflects its light from the mirrored areas of the striped mirror, causing an interlaced composite image made from both images, with orthogonal polarization.

Another method of 3-D projection which can be used is rear-screen auto-stereoscopic 3-D projection. This method does not require any special glasses for 3-D viewing. Two identical lenticular lens screens, placed back-to-back with a thin translucent screen between them are projected upon at different angles by two or more video projectors, bearing stereo or multiple-angles-of-view information. The images can be viewed from the opposite side of the screen at various locations in space. As one moves to various locations, around the screen, the images are viewable, one at a time, without image overlap. This creates several orthoscopic as well as pseudoscopic viewing zones in space. If one positions his eyes in an orthoscopic viewing zone such that one image goes to each eye, a 3-D view will be visible. Many viewers will be able to view an orthoscopic 3-D video image from several angles at once.

The systems disclosed in this application all use discrete and individually, electrically addressed and maintained pixels. This approach provides the basis for true digital television, which does not exist today. Presently, both audio and video signals are digitized and stored as digital bits on laser disks and "CDs." This digitization preserves the exact values of the signal from microsecond to micro-second. Distortions in the systems such as amplifier noise and non-linearity, scratches, dropout, and other defects on the recording material, ghost signals, and so on can be completely ignored by a system only looking at each bit to see if it is on or off, i.e., a "0" or a "1", and not caring if it varies in strength or clarity. However, once the digital data is read, amplifiers and the heart of today's video systems—the CRT—must utilize an analog signal, reintroducing noise and false data and degrading the quality of the image.

The basis of a CRT is an electron beam scanning a phosphor, varying its strength in an analog fashion as it goes. By contrast, the present invention is actually a digital computer on each pixel, best operating in a digital mode. This will result in more precise, higher quality television and video display. The upcoming thrust toward High Definition Television should move the field toward this type of a digital display device as the system of choice. To increase resolution, one only needs to increase the number of pixels just as a computer RAM is increased by adding more chips. In summary, the present invention makes possible a viable basis for implementation of digital and High Definition TV, regardless of the format convention selected.

While the preferred embodiments of the invention have been illustrated in detail, modifications and adaptations of such embodiments will be apparent to those skilled in the art. However, it is to be expressly understood that such modifications and adaptations are within the spirit and scope of the present invention as set forth in the following claims.

What is claimed is:

1. A video display system, comprising:
   a liquid crystal display (LCD) device having a plurality of pixels arranged in a matrix for forming an image;
   a solid state storage element associated with each pixel for storing a respective pixel control signal;
   control means associated with said solid state storage elements for controlling the operation thereof, said control means, storage elements and LCD forming an active matrix LCD, said active matrix including dead spaces;
   means for maintaining color registration of pixel images; and
   means for directly projecting the image formed by said LCD onto a viewing area while maintaining color registration such that registered pixel images are caused to eliminate dead spaces between pixels.

2. The video display system of claim 1 wherein said control means associated with each pixel includes a transistor, said transistor when turned on by a gate signal, conducts a voltage of a specific value associated with the desired brightness at its respective pixel.

3. The video display system of claim 2, wherein said transistor includes a field effect transistor.

4. The video display system of claim 1, wherein substantially no light emanates from said dead spaces.

5. The video display system of claim 4, further comprising a light-blocking covering positioned between pixels.

6. The video display system of claim 1, further comprising a heat sink adapted to dissipate heat energy from said projecting means and/or said active matrix.

7. The video display system of claim 1, wherein said projection means includes lens elements coated for heat reflection.

8. The video display system of claim 1, further comprising heat absorbing elements adapted to dissipate heat energy from said projecting means and/or said active matrix.

9. The video display system of claim 1, further comprising a fluid means adapted to dissipate heat energy from said projecting means and/or said active matrix.

10. The video display system of claim 1, wherein said projecting means further comprises reflective optics constructed of a metalic substance.

11. The video display system of claim 1, further comprising; a heat sensing device for sensing heat in proximity to the active matrix, wherein said device monitors temperature and biases the active matrix LCD to counter temperature fluctuation effects.

12. The video display system of claim 1, further comprising a plurality of LCDs to project multiple images onto the viewing area to produce a black and white or colored image.

13. The video display system of claim 1, further comprising dichroic optics, wherein said dichroic optics overlap differently colored LCD projected images permitting said images to be focused onto a screen with a single projection lens system.

14. The video display system of claim 4, further comprising a mirror system to duplicate the image of the pixels into the dead spaces between pixels.

15. The video display system of claim 4, further comprising lenses to fill the dead spaces between pixels.

16. The video display system of claim 15, wherein said lenses are arranged in a lens array.

17. The video display system of claim 16, wherein said lens array is lenticular.

18. The video display system of claim 1, wherein said LCD is a full-color LCD, comprising pixels of a plurality of colors.

19. The video display system of claim 18, wherein light emanating from one of the colored pixels overlaps light emanating from another colored pixel.

20. The video display system of claim 19, wherein substantially no light emanates from said dead spaces.

21. The video display system of claim 20, wherein said image is replicated to fill the dead spaces between pixels.

22. The video display system of claim 20, wherein light emanating from each of the plurality of colored pixels is optically expanded, individually, to fill the dead spaces between pixels.

23. The video display system of claim 1, further comprising:
a liquid crystal container, wherein said container is stepped to produce different cavity lengths of liquid crystal corresponding to different wavelengths of light to be projected through different areas of the liquid crystal display.

24. The video display system of claim 1, further comprising means for projecting the image onto a ceiling.

25. The video display system of claim 1, wherein said viewing area comprises a venetian blind type of screen comprising a plurality of rotatable slats wherein such slats are substantially rigid and mechanically rotatable.

26. The video display system of claim 1, further comprising a projection lens system, wherein said lens system trapezoidally pre-distorts the image to compensate for keystone distortion resulting from projection of the image onto a surface such that the surface is not normal to a line joining the surface and the projection lens.

27. The video display system of claim 1, wherein said system projects onto a surface which is not normal to a line joining the surface and the projection optics, wherein the LCD and projection optics are tilted so that their planes intersect at a line which also intersects the plane of the surface being projected upon.

28. The video display system of claim 1, further comprising a plurality of projection means, wherein the projection means project polarized stereoscopically-related images onto a non-depolarizing screen to be viewed in 3-D.

29. The video display system of claim 28, wherein said stereoscopically related images are optically integrated before being further projected by a single projection lens system onto a screen.

30. The video display system of claim 1, further comprising a plurality of projection means, wherein said projection means project images emanating therefrom onto a screen comprising two lenticular lenses positioned back to back, restricting angle of view of each image.

31. The video display system of claim 1, further comprising a sound suppression system for eliminating cooling system noise.

32. The video display system of claim 31, wherein said sound suppression system comprises sound absorbing material.

33. The video display system of claim 31, wherein said sound suppression system further comprises barriers to deflect sound.

34. The video display system of claim 31, wherein said sound suppression system further comprises:
a microphone;
a speaker; and
a circuit to alter phase of a sound signal detected by the microphone before sending it to the speaker.

35. The video display system of claim 1, wherein the viewing area has a surface which is textured to reduce glare.

36. The video display system of claim 1, wherein said viewing area is darkly colored.

37. The video display system of claim 1, wherein electronic signals relating to formation of the image are digitized.

38. The video display system of claim 1, wherein high resolution data is used for the display of a high resolution image.

39. The video display system of claim 1, wherein the image enters one of two ends of a coherent fiber-optic bundle and is subsequently viewed at the other end of the fiber-optic bundle.

40. The video display systems of claim 39, wherein lenses magnify the image emanating from the fiber-optic bundle before it is viewed.

41. The video display system of claim 1, wherein the means for projecting further comprises a means to expand the pixel images to eliminate said dead space.

42. The video display system of claim 1, wherein the means for projecting duplicates all or part of the pixel images to eliminate said dead space.

43. A video display system, comprising:
a liquid crystal display (LCD) device having a plurality of pixels arranged in a matrix for forming a black and white image;
a solid state pixel storage element associated with each pixel for storing a respective pixel control signal;
control means associated with said solid state pixel storage elements for controlling the operation thereof, said control means, pixel storage elements and LCD forming an active matrix LCD, said active matrix including dead spaces; and
means for projecting the image formed by said LCD onto a viewing area such that pixel images are caused to eliminate dead spaces between pixels.

44. A video display system, comprising:
a liquid crystal display (LCD) device having a plurality of pixels arranged in a matrix for forming an image;
a solid state pixel storage element associated with each pixel for storing a respective pixel control signal;
control means associated with said solid state pixel storage elements for controlling the operation thereof, said control means, pixel storage elements and LCD forming an active matrix LCD, said active matrix including dead spaces; and
means for projecting the image formed by said LCD onto a viewing area such that all or part of pixel image are duplicated and caused to eliminate dead spaces between pixels.

45. A video display system, comprising:
a liquid crystal display (LCD) device having a plurality of pixels arranged in a matrix for forming an image;
a solid state pixel storage element associated with each pixel for storing a respective pixel control signal;
control means associated with said solid state pixel storage elements for controlling the operation thereof, said control means, pixel storage elements and LCD forming an active matrix LCD, said active matrix including dead spaces; and
means for projecting the image formed by said LCD onto a viewing area such that dead spaces between pixels are substantially eliminated.

46. A video display system, comprising:
a liquid crystal display (LCD) device having a plurality of pixels arranged in a matrix for forming an image;
a solid state pixel storage element associated with each pixel for storing a respective pixel control signal;
control means associated with said solid state pixel storage elements for controlling the operation thereof, said control means, pixel storage elements and LCD forming an active matrix LCD, said active matrix including dead spaces; and
means for projecting the image formed by said LCD onto a viewing area such that pixel images are expanded and caused to eliminate dead spaces between pixels.

47. A video display system, comprising:
a liquid crystal display (LCD) device having a plurality of pixels arranged in a matrix for forming a black and white image;
a solid state pixel storage element associated with each pixel for storing a respective pixel control signal;
control means associated with said solid state pixel storage elements for controlling the operation thereof, said control means, pixel storage elements and LCD forming an active matrix LCD, said active matrix including dead spaces; and
means for projecting the image formed by said LCD onto a viewing area such that all or part of pixel images are duplicated and caused to eliminate dead spaces between pixels.

48. A video display, comprising:
a liquid crystal display (LCD) device having a plurality of pixels arranged in a matrix for forming a black and white image;
a solid state pixel storage element associated with each pixel for storing a respective pixel control signal;
control means associated with said solid state pixel storage elements for controlling the operation thereof, said control means, pixel storage elements and LCD forming an active matrix LCD, said active matrix including dead spaces; and
means for projecting the image formed by said LCD onto a viewing area such that all or part of said pixels are expanded to eliminate dead spaces between said pixels.

* * * * *

UNITED STATES PATENT AND TRADEMARK OFFICE
CERTIFICATE OF CORRECTION

PATENT NO. : 5,012,274
DATED : April 30, 1991
INVENTOR(S) : Eugene Dolgoff

It is certified that error appears in the above-indentified patent and that said Letters Patent is hereby corrected as shown below:

TITLE PAGE

"[56] References Cited" indicates the "U.S. PATENT DOCUMENTS" list and "OTHER PUBLICATIONS" list are "(. . . continued on next page)." No such continuation appears on the next page. Other references which were brought to the Patent Office's attention are not listed on the first page of the patent.

Column 1, line 21, "units have" should read -- units which have --.

Column 1, line 22 "diagonally) which is" should read -- diagonally) is --.

UNITED STATES PATENT AND TRADEMARK OFFICE
CERTIFICATE OF CORRECTION

PATENT NO. : 5,012,274
DATED : April 30, 1991
INVENTOR(S) : Eugene Dolgoff

It is certified that error appears in the above-indentified patent and that said Letters Patent is hereby corrected as shown below:

Column 1, line 29, "these mere inconveniences," should read -- these inconveniences, --.

Column 1, line 29, "from X-rays" should read -- from radiation --.

Column 2, line 4, "the X-ray hazard" should read -- the radiation hazard --.

Column 3, line 13, "through the" should read -- through to the --.

Column 3, line 50, "flicker" should read -- flicker, --.

UNITED STATES PATENT AND TRADEMARK OFFICE

CERTIFICATE OF CORRECTION

PATENT NO. : 5,012,274
DATED : April 30, 1991
INVENTOR(S) : Eugene Dolgoff

It is certified that error appears in the above-identified patent and that said Letters Patent is hereby corrected as shown below:

Column 3, line 63, "X-rays or" should rad -- FIG. 1 --.

Column 4, line 46, "FIG. 1/" should read -- FIG. 1 --.

Column 5, line 45, "polarization/rotation" should read -- polarization rotation --.

Column 5, line 62, "only art" should read -- only part --.

Column 5, line 68, "LCD This" should read -- LCD. This --.

Column 6, line 39, "crosstalk" should read -- cross talk --.

UNITED STATES PATENT AND TRADEMARK OFFICE
CERTIFICATE OF CORRECTION

PATENT NO. : 5,012,274
DATED : April 30, 1991
INVENTOR(S) : Eugene Dolgoff

It is certified that error appears in the above-indentified patent and that said Letters Patent is hereby corrected as shown below:

Column 6, line 33, "color mix mix" should read -- color mix --.

Column 6, line 34, "black reflective" should read -- black, reflective --; "other over" should read -- other covering over --.

Column 7, line 42, "noise sends" should read -- noise and sends --.

Column 7, line 60, "distortion, resultant" should read -- distortion resultant --.

Column 7, line 61, "effects resulting" should read -- effects, resulting --.

UNITED STATES PATENT AND TRADEMARK OFFICE

CERTIFICATE OF CORRECTION

PATENT NO.    : 5,012,274
DATED         : April 30, 1991
INVENTOR(S)   : Eugene Dolgoff It is certified that error appears in the above-identified patent and that said Letters Patent is hereby corrected as shown below:

Column 8, line 14, "inexpensive, full color" should read -- inexpensive full color --.

Figure 9B:
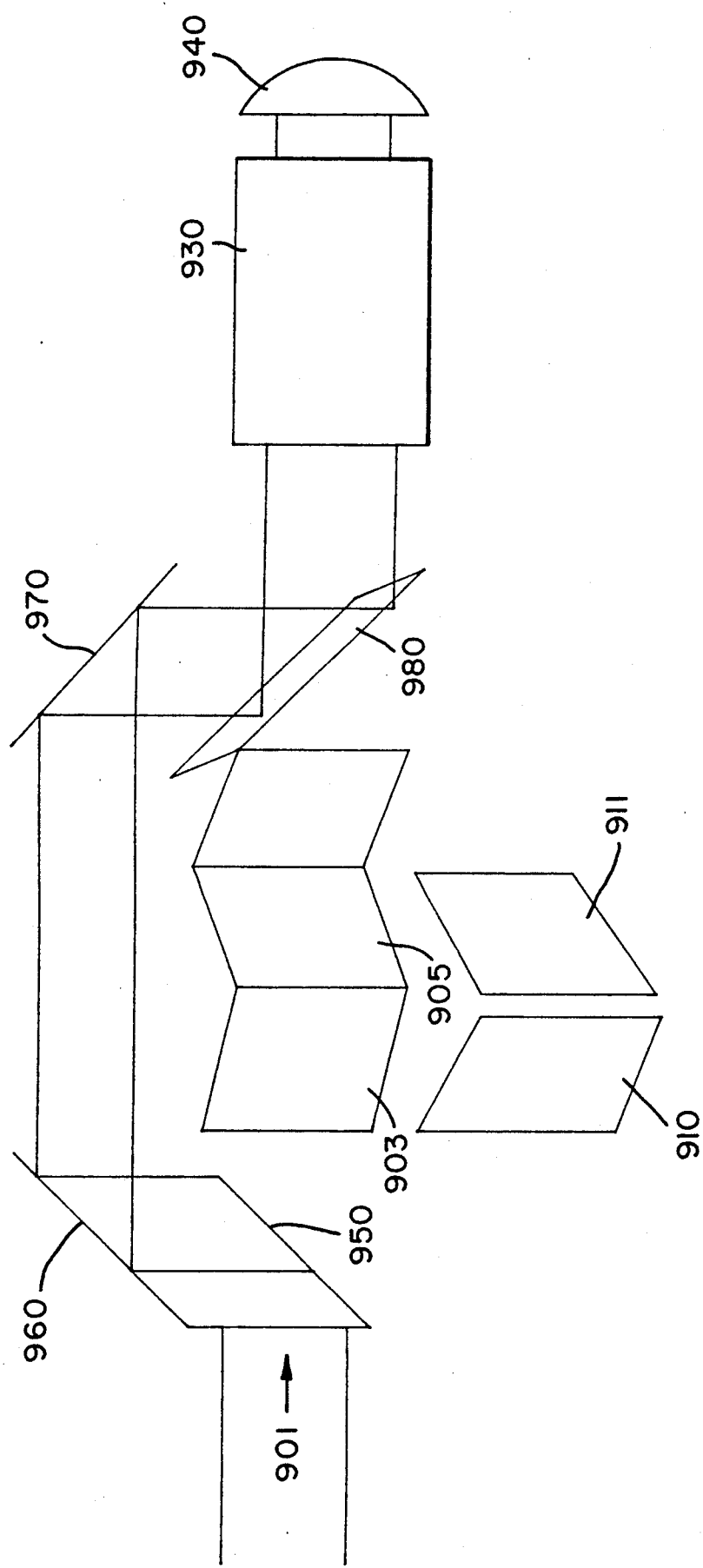
FIG. 9b is a schematic view of the embodiment of the dichroic mirror system of FIG. 9a, modified to include an additional light path.

Column 9, line 65, "FIG. 9" should read -- FIG. 9a and FIG. 9b --.

Column 11, line 65, "each pixel, 802)" should read -- each full color pixel, 802) --.
This --.

Signed and Sealed this

Fourth Day of January, 1994

Attest:

BRUCE LEHMAN

*Attesting Officer*    *Commissioner of Patents and Trademarks*